United States Patent
Chae et al.

(10) Patent No.: US 9,907,017 B2
(45) Date of Patent: Feb. 27, 2018

(54) COMMUNICATION METHOD AND APPARATUS

(71) Applicant: Samsung Electronics Co., Ltd., Suwon-si (KR)

(72) Inventors: Sung Ho Chae, Hwaseong-si (KR); Nam Jeong Lee, Suwon-si (KR); Jong Bu Lim, Yongin-si (KR); Jong Ho Bang, Suwon-si (KR); Kyung Hun Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 5 days.

(21) Appl. No.: 14/520,010

(22) Filed: Oct. 21, 2014

(65) Prior Publication Data
US 2015/0229414 A1    Aug. 13, 2015

(30) Foreign Application Priority Data
Feb. 12, 2014 (KR) .................... 10-2014-0016068

(51) Int. Cl.
| | | |
|---|---|---|
| H04B 1/44 | (2006.01) |
| H04W 52/02 | (2009.01) |
| H04B 7/08 | (2006.01) |
| H04B 1/10 | (2006.01) |
| H04L 5/14 | (2006.01) |

(52) U.S. Cl.
CPC ...... H04W 52/0209 (2013.01); H04B 1/1009 (2013.01); H04B 7/0825 (2013.01); H04L 5/14 (2013.01); *H04L 5/1461* (2013.01); *Y02B 60/50* (2013.01)

(58) Field of Classification Search
CPC ......... H04B 15/00; H04B 1/40; H04B 7/0825
USPC ................................................ 455/73
See application file for complete search history.

(56) References Cited

U.S. PATENT DOCUMENTS

| | | | |
|---|---|---|---|
| 2002/0039912 A1* | 4/2002 | Yamaguchi ............ H01Q 1/246 455/561 |
| 2002/0127978 A1* | 9/2002 | Khatri .................. H04B 7/0413 455/103 |
| 2004/0132414 A1* | 7/2004 | Sendyk ............... H04B 7/0848 455/73 |
| 2006/0057975 A1 | 3/2006 | Boyle et al. |
| 2008/0062065 A1* | 3/2008 | Yamamoto ............. H01Q 1/243 343/861 |
| 2013/0089009 A1* | 4/2013 | Li ....................... H04L 27/2601 370/278 |
| 2013/0147672 A1 | 6/2013 | Desclos et al. |
| 2014/0126437 A1* | 5/2014 | Patil ..................... H04B 7/0486 370/310 |

OTHER PUBLICATIONS

Alrabadi, Osama N., et al. "A universal encoding scheme for MIMO transmission using a single active element for PSK modulation schemes." Wireless Communications, IEEE Transaction on 8.10 (2009): 5133-5142.

* cited by examiner

*Primary Examiner* — Raj Chakraborty
(74) *Attorney, Agent, or Firm* — NSIP Law

(57) ABSTRACT

A communication method and apparatus for cancelling interference are provided. The communication apparatus includes an active element configured to receive a first signal and a parasitic element configured to receive a second signal. A third signal is generated by cancelling interference in the first signal using the second signal.

27 Claims, 15 Drawing Sheets

COMMUNICATION METHOD AND APPARATUS

CROSS-REFERENCE TO RELATED APPLICATION(S)

This application claims the benefit under 35 USC 119(a) of Korean Patent Application No. 10-2014-0016068, filed on Feb. 12, 2014, in the Korean Intellectual Property Office, the entire disclosure of which is incorporated herein by reference for all purposes.

BACKGROUND

1. Field

The following description relates to a communication method and apparatus, and more particularly, to a method and apparatus to cancel an interference signal in a wireless signal.

2. Description of Related Art

Wireless communication may be performed between a transmitter (TX) and a receiver (RX).

The RX decodes a desired signal through interference control, without channel information from the TX.

In an example of "n" interference signals, "n+1" antennas, and "n+1" radio frequency (RF) chains may be required by the RX to control interference.

An RF chain refers to all operations or all components including an antenna part and a digital part. For example, an RF chain indicates a series of circuits between an antenna part and a digital part. The RF chain may include a mixer and an amplifier (amp). The amp is, for example, a power amp.

Due to an increase in a number of interference signals, a cost required to implement an RX may increase, and an amount of power consumed by the RX may increase. Additionally, to implement the RX, a distance between antennas of at least λ/2 needs to be ensured, and a configuration of an RF circuit may occupy a significant amount of space. As fundamental limitations of RF devices, a size of each RF device needs to be determined in proportion to a wavelength of a wireless signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a communication apparatus, including an active element configured to receive a first signal; and a parasitic element configured to receive a second signal, wherein a third signal is generated by cancelling interference in the first signal using the second signal.

The communication apparatus may be configured to cancel interference by applying the second signal to the first signal, and wherein the interference may be cancelled through mutual coupling caused by the parasitic element.

The communication apparatus may also include a mutual coupling control circuit configured to cancel the interference through mutual coupling between the first signal and the second signal.

The mutual coupling may be performed through adjustment of a value of a load impedance and a value of mutual coupling of the mutual coupling control circuit.

The communication apparatus may also include a phase shifter configured to apply phase shifting to each of the first signal and the second signal, and to generate the third signal.

The third signal may be generated by cancelling interference in the first signal using parasitic elements.

The communication apparatus may also include a phase shifter configured to apply phase shifting to each of the first signal and second signals to generate the third signal.

The communication apparatus may include active elements, wherein third signals may be simultaneously generated, and wherein a number of the active elements may be equal to a number of the third signals.

First signals may be generated by a transmitter (TX), and the third signal may be generated by cancelling signals other than a signal that the communication apparatus desires to receive, among the first signals.

The communication apparatus may also include a transmitting unit configured to output a fourth signal, wherein the communication apparatus may support full-duplex communication, and wherein the fourth signal may cause the interference.

In accordance with an illustrative example, there is provided a communication method, including calculating a load impedance of a parasitic element to control interference; and cancelling interference in a first signal output from an active element to generate a third signal, using the parasitic element of which the load impedance is adjusted to the calculated load impedance.

The interference may be cancelled through mutual coupling caused by the parasitic element.

The generating may include generating the third signal by cancelling interference in the first signal using parasitic elements.

The communication method may include simultaneously generating third signals, wherein a number of active elements may be equal to a number of the third signals.

The third signal may be generated by cancelling first signals other than the first signal that the communication apparatus desires to receive.

The parasitic element may receive a second signal.

The third signal is generated by cancelling interference in the first signal using the second signal.

In accordance with an illustrative example, there is provided a non-transitory computer readable recording medium storing a program to cause a computer to perform the method described above.

In accordance with another illustrative example, there is provided a communication method, including calculating a phase of a phase shifter to control interference; and generating a third signal by cancelling interference in a first signal output from an active element using the calculated phase of the phase shifter.

In accordance with an illustrative example, there is provided a non-transitory computer readable recording medium storing a program to cause a computer to perform the method described above.

In accordance with a further illustrative example, there is provided a communication apparatus, including a processor configured to receive a first signal from an active element, receive a second signal from a parasitic element, apply the second signal to the first signal to cancel interference in the first signal, generate a third signal, and generate a digital signal based on the third signal in which interference is cancelled.

The processor may apply a value of a phase to the first signal, and may apply a different value of a phase to the second signal to cancel interference on the first signal.

The processor may include a phase shifter configured to shift a phase of each of the first signal and the second signal, and generate the third signal by combining the first signal and the second signal with the shifted phases, and an RF chain configured to receive the third signal from the phase shifter and output the digital signal based on the third signal.

A distance between the active element and the parasitic element may be in a range of 0 to $\lambda/2$.

The communication apparatus may also include a mutual coupling controller connected to the parasitic element and configured to cancel the interference in the first signal by adjusting a value of a load impedance and a value of the mutual coupling between the first signal and the second signal.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
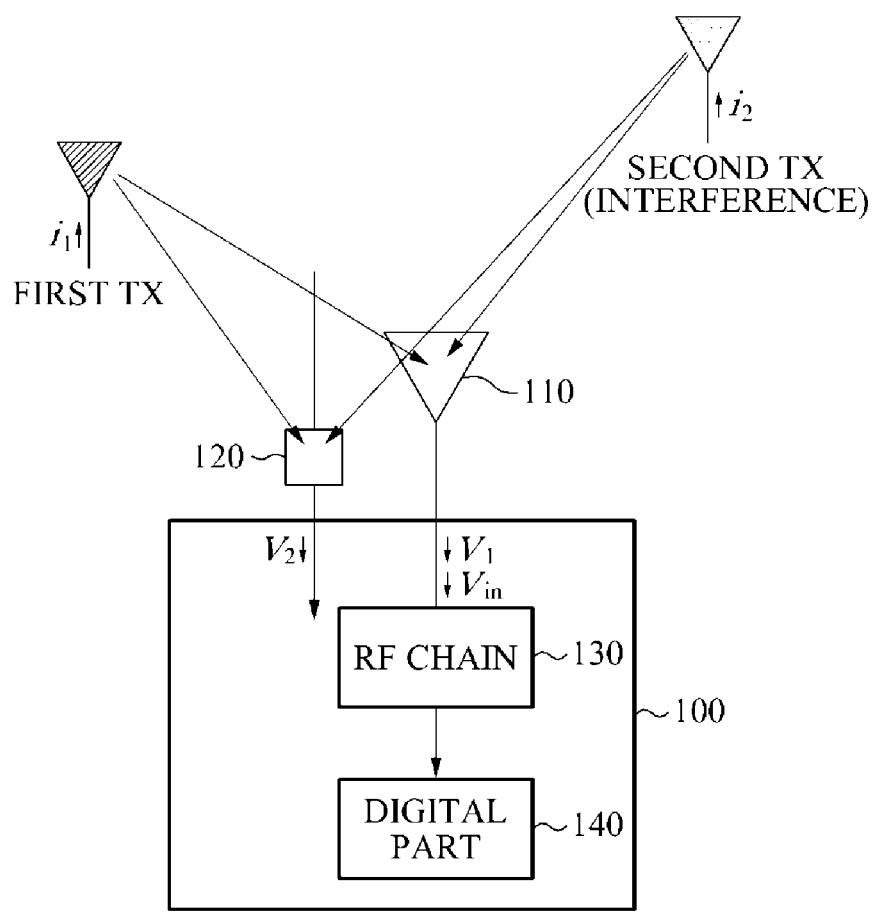
FIG. 1 is a diagram illustrating an example of a configuration of a communication apparatus, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present.

FIG. 1 illustrates an example of a configuration of a communication apparatus 100, in accordance with an embodiment.

The communication apparatus 100 may be, for example, a node of wireless communication. The communication apparatus 100 operates as a receiver (RX). Additionally, the communication apparatus 100 may be a base station or a terminal, or an RX of the base station or the terminal.

Referring to FIG. 1, the communication apparatus 100 includes an active element 110, a parasitic element 120, and a radio frequency (RF) chain 130. In an alternative configuration, the active element 110 and the parasitic element 120 may be configured to be external to or separated from the communication apparatus 100.

The active element 110 may be used as a reference antenna. The active element 110 receives a first signal, and outputs the received first signal. The first signal refers to a signal received by the active element 110. $V_1$ indicates the first signal output from the active element 110.

The parasitic element 120 may be used as a parasitic antenna. The parasitic element 120 receives a second signal, and outputs the received second signal. The second signal is a signal received by the parasitic element 120. The second signal may be used to cancel interference in the first signal. $V_2$ indicates the second signal output from the parasitic element 120.

The active element 110 and the parasitic element 120 may be located adjacent to each other. For example, a distance between the active element 110 and the parasitic element 120 may be in a range of 0 to $\lambda/2$. Accordingly, the communication apparatus 100 is constructed at a lower cost and consumes a lower amount of power compared to another communication apparatus employing an existing array antenna. As a result, the communication apparatus 100 may be applied to a small-sized apparatus, for example, a terminal The first signal and the second signal are signals received at the active element 110 and the parasitic element 120, respectively, from a plurality of transmitters (TXs). Referring to FIG. 1, the plurality of TXs include a first TX and a second TX. A signal is a stream of data transmitted from a TX to an RX. For example, the TX transmits a stream of data as a signal to the RX.

One of the plurality of TXs corresponds to an RX, and outputs a signal that the RX desires to receive. The other TXs are interference TXs configured to output interference signals. In FIG. 1, the first TX corresponds to the communication apparatus 100, and the second TX interferes with the communication apparatus 100.

An interference signal is a signal of which interference is to be cancelled. For example, to extract or restore a signal that the communication apparatus 100 desires to receive from the received first signal $V_1$, the communication apparatus 100 cancels an interference signal in the received first signal $V_1$.

In FIG. 1, a signal output from the first TX as a corresponding TX is indicated by $i_1$, and a signal output from the second TX as an interference TX is indicated by $i_2$. For example, when a base station and a terminal are used as a TX and an RX, respectively, the signals $i_1$ and $i_2$ are signals in a downlink from the base station to the terminal.

The communication apparatus 100 is a processor configured to generate a third signal $V_{in}$ based on the received first signal $V_1$ and the received second signal $V_2$. The third signal $V_{in}$ is generated by applying interference cancellation to the first signal The third signal $V_{in}$ corresponds to the signal it transmitted by the first TX. For example, the third signal $V_{in}$ is calculated by applying a predetermined equation to the signal Additionally, the signal $i_1$ is restored by applying a predetermined equation to a signal associated with the third signal $V_{in}$.

The RF chain 130 may receive the third signal $V_{in}$.

Referring to FIG. 1, the communication apparatus 100 further includes a digital part 140. The active element 110, the parasitic element 120, and the RF chain 130 form an RF part. In an alternative configuration in which the active element 110 and the parasitic element 120 are external to the communication apparatus 100, the RF chain 130 forms the RF part. In further another configuration in which the active element 110 and the parasitic element 120 are external to the communications apparatus 100, a combination of the active element 110, the parasitic element 120, and the RF chain 130 form the RF part. The RF chain 130 generates a digital signal to be input to the digital part 140.

The communication apparatus 100 operates as an RX, to control interference of a signal in the RF chain 130. For example, before the received first signal $V_1$ is input to the digital part 140, the RF chain 130 cancels interference in the first signal $V_1$, and generates a signal to be input to the digital part 140 based on the third signal $V_{in}$ in which interference is cancelled.

An operation of each of the active element 110, the parasitic element 120 and the RF chain 130 will be further described with reference to FIG. 2.

Typically, the RF chain 130 among wireless communication modules of the communication apparatus 100 consumes a large amount of power, and tends to be expensive for its complex configuration. The communication apparatus 100 includes a single RF chain, for example the RF chain 130 of FIG. 1, and cancels interference. Accordingly, the communication apparatus 100 reduces power consumption and costs.

The communication apparatus 100 controls interference using the parasitic element 120. As a result, high power consumption and high installation costs of a receiving unit to increase a signal-to-noise ratio (SNR) are solved. Additionally, space occupied by the active element 110 and the RF chain 130 in the communication apparatus 100 may become more compact.

The communication apparatus 100 of FIG. 1 may use all schemes of cancelling interference in a received signal using the parasitic element 120. Additionally, an example of an interference cancellation scheme using the parasitic element 120 will be further described with reference to FIGS. 3 and 5.

Figure 2:
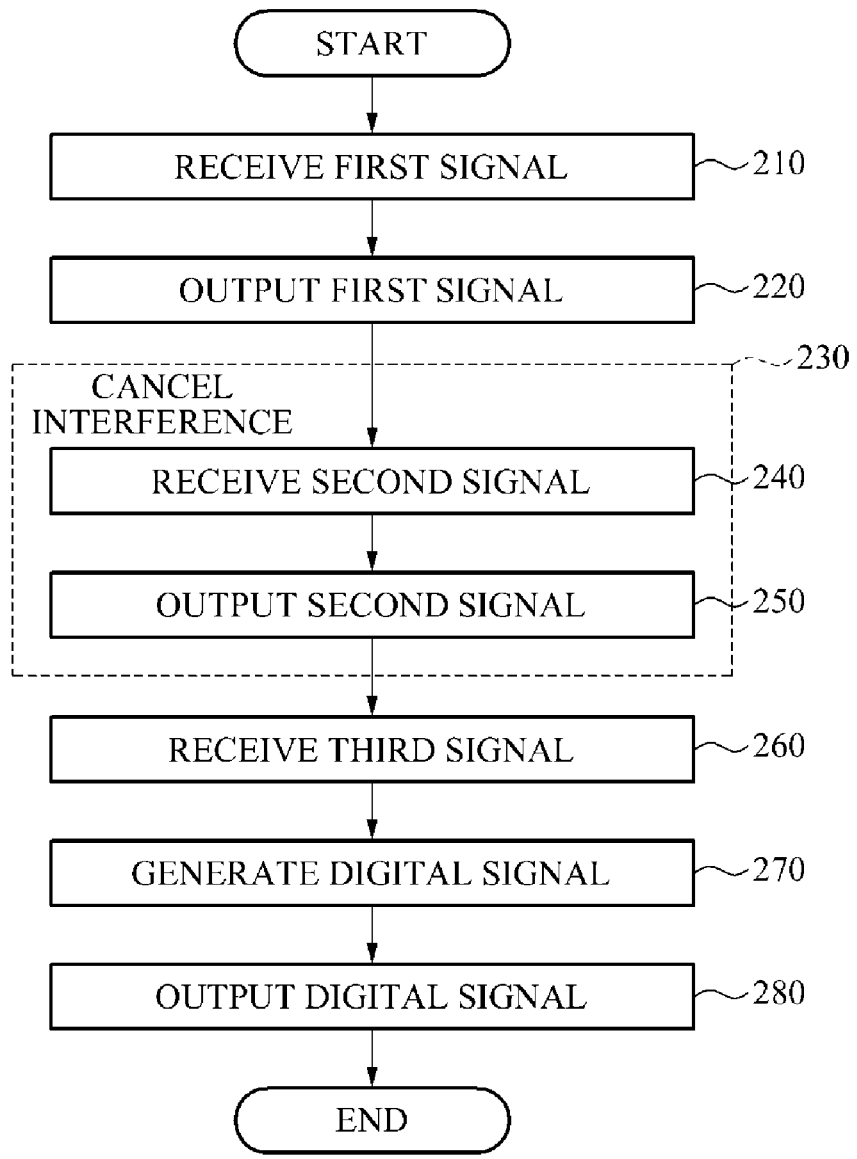
FIG. 2 is a flowchart illustrating an example of a communication method, in accordance with an embodiment.

FIG. 2 illustrates an example of a communication method, in accordance with an embodiment.

Referring to FIG. 2, in operation 210, the method receives, through the active element 110, the first signal $V_1$.

In operation 220, the method outputs, through the active element 110, the received first signal $V_1$.

In operation 230, the method generates, at the communication apparatus 100, the third signal $V_{in}$ by cancelling interference in the first signal $V_1$, using the parasitic element 120.

For example, the method at the communication apparatus 100 cancels interference in the first signal $V_1$, using the second signal $V_2$ from the parasitic element 120. The method of the communication apparatus 100 applies interference cancellation using the second signal $V_2$ to the first signal $V_1$, and generates the third signal $V_{in}$.

Operation 230 may include operations 240 and 250.

In operation 240, the method receives, through the parasitic element 120, the second signal $V_2$. The second signal $V_2$ may be used to cancel interference in the first signal In operation 250, the method outputs from the parasitic element 120 the received second signal $V_2$.

In operation 260, the method at the RF chain 130 receives the third signal $V_{in}$. The third signal $V_{in}$ is generated by applying interference cancellation using the second signal $V_2$ to the first signal $V_1$. In an alternative configuration, the RC chain 130 generates the Yin by applying interference cancellation using the second signal $V_2$ to the first signal In operation 270, the method generates through the RF chain 130 a digital signal to be input to the digital part 140. The RF chain 130 converts the third signal $V_{in}$ to the digital signal.

In operation 280, the method outputs, through the RF chain 130, the digital signal to the digital part 140.

Figure 3:
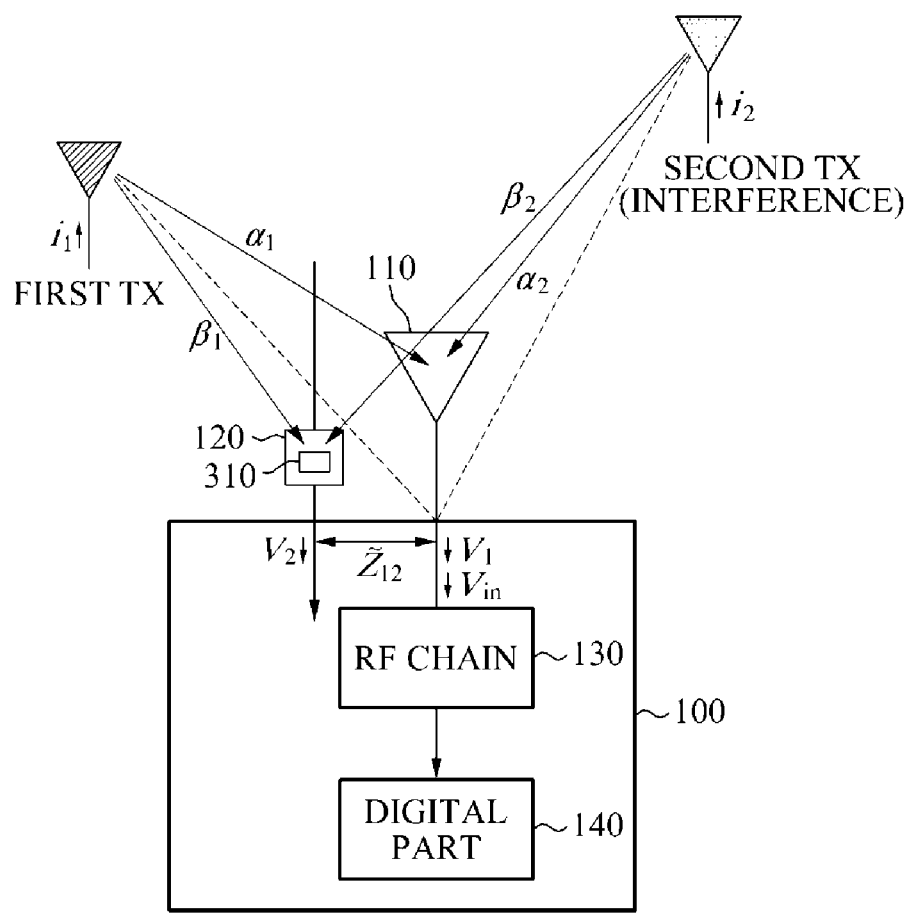
FIG. 3 is a diagram illustrating another example of the configuration of the communication apparatus to cancel interference using mutual coupling, in accordance with an embodiment.

FIG. 3 illustrates another example of the configuration of the communication apparatus 100 to cancel interference using mutual coupling, in accordance with an embodiment.

An interference cancellation scheme using a mutual coupling control circuit 310 is described with reference to FIG. 3. For example, interference is cancelled through mutual coupling caused by the parasitic element 120. Utilization of the interference cancellation scheme may increase, as a distance between the active element 110 and the parasitic element 120 decreases.

Referring to FIG. 3, the parasitic element 120 includes the mutual coupling control circuit 310. The mutual coupling control circuit 310 is included in the parasitic element 120 as illustrated in FIG. 3. In an alternative configuration, the mutual coupling control circuit 310 may be external to the parasitic element 120 and operatively connected to the parasitic element 120. In a further alternative configuration, the mutual coupling control circuit 310 may be an integral circuit in the communication apparatus 100.

Through mutual coupling caused by the mutual coupling control circuit 310, a phenomenon in which the first signal $V_1$ and the second signal $V_2$, respectively, received at the active element 110 and the parasitic element 120, respectively, affect each other may be alleviated. Accordingly, the signal it required by the communication apparatus 100 may be restored.

In a state in which an influence of the signal $i_2$ from the first signal $V_1$ is removed, the communication apparatus 100 restores the signal it by adjusting a value of a load impedance and a value of the mutual coupling of the mutual coupling control circuit 310. By the mutual coupling control circuit 310 having the adjusted value of the mutual coupling and the adjusted value of the load impedance, in a state in which the influence of the signal $i_2$ in the active element 110 is maximally removed, the signal $i_1$ is restored.

By adjusting the value of the mutual coupling, the first signal $V_1$ and the second signal $V_2$, which are coupled, are converted to signals $U_1$ and $U_2$, which are uncoupled, respectively.

The first signal $V_1$ and the second signal $V_2$ are converted to the signals $U_1$ and $U_2$, respectively, based on Equation 1 shown below. Each of the signals $U_1$ and $U_2$ may correspond to an isolated voltage.

$$\begin{bmatrix} U_1 \\ U_2 \end{bmatrix} = \begin{bmatrix} 1 & \frac{\tilde{Z}_{12}}{Z_L} \\ \frac{\tilde{Z}_{21}}{Z_L} & 1 \end{bmatrix} \begin{bmatrix} V_1 \\ V_2 \end{bmatrix}$$ [Equation 1]

In Equation 1, $\tilde{Z}_{12}$ denotes a value of the mutual coupling of the mutual coupling control circuit 310, and $Z_L$, denotes a value of the load impedance of the mutual coupling control circuit 310. In a matrix of a right portion in Equation 1, $\tilde{Z}_{12}$ in a first row and a second column may have the same value as $\tilde{Z}_{21}$ in a second row and a first column To cancel interference, the communication apparatus 100 may overcome an influence of the mutual coupling by adjusting the values $\tilde{Z}_{12}$ and $Z_L$, based on Equation 1.

A mutual coupling adjustment constant may be denoted by γ, and may be referred to as an interference control coefficient. When a value of the mutual coupling adjustment constant γ is set as shown in Equation 2 below, the first signal $V_1$ received at the active element 110, and the second signal $V_2$ received at the parasitic element 120 are calculated as shown in Equations 3 and 4, respectively, below.

$$\gamma = \frac{\tilde{Z}_{12}}{Z_L}$$ [Equation 2]

$$V_1 = \frac{1}{1-\gamma^2}(U_1 - \gamma U_2)$$ [Equation 3]

$$= \frac{1}{1-\gamma^2}(\alpha_1 i_1 + \alpha_2 i_2 + n_1 - \gamma(\beta_1 i_1 + \beta_2 i_2 + n_2))$$

$$V_2 = \frac{1}{1-\gamma^2}(U_2 - \gamma U_1)$$ [Equation 4]

$$= \frac{1}{1-\gamma^2}(\beta_1 i_1 + \beta_2 i_2 + n_2 - \gamma(\alpha_1 i_1 + \alpha_2 i_2 + n_1))$$

In Equations 3 and 4, $\alpha_1$ denotes a channel coefficient of a channel between the active element 110 and the first TX, that is, a corresponding TX configured to transmit a signal desired by the communication apparatus 100, and $\alpha_2$ denotes a channel coefficient of a channel between the active element 110 and the second TX, that is, an interference TX configured to transmit an interference signal.

Additionally, $\beta_1$ denotes a channel coefficient of a channel between the first TX and the parasitic element 120, and $\beta_2$ denotes a channel coefficient of a channel between the second TX and the parasitic element 120.

$n_1$ denotes noise in the active element 110, and $n_2$ denotes noise in the parasitic element 120.

The mutual coupling control circuit 310 includes an RLC circuit with a resistor, an inductor, and a capacitor. The communication apparatus 100 adjusts the RLC circuit, using a circuit between the first signal $V_1$ and the second signal $V_2$.

The communication apparatus 100 may set the value of the interference control coefficient γ, as shown in Equation 5 below, by adjusting the values $\tilde{Z}_{12}$ and $Z_L$.

$$\gamma = \frac{\alpha_2}{\beta_2}$$ [Equation 5]

When the value of the interference control coefficient γ is set as a value obtained by dividing $\alpha_2$ by $\beta_2$ in Equation 5, an interference signal is cancelled in an RF part, the first signal $V_1$ received by the active element 110 is modified as shown in Equation 6 below.

$$V_1 = \alpha'_1 i_1 + n'_1$$ [Equation 6]

In Equation 6, $\alpha'_1$ denotes a new channel coefficient of the channel between the first TX and the active element 110 after interference cancellation.

$n'_1$ denotes new noise after interference cancellation.

Additionally, in accord with one configuration, the third signal $V_{in}$ input to the RF chain 130 is identical to the first signal $V_1$ in which interference is cancelled by interaction.

In Equation 5, the signal $i_2$ may not exist. Referring to Equation 5, the first signal $V_1$ is independent of the signal $i_2$. The signal $i_2$ is output from the second TX. As described above with reference to Equation 5, a component associated with interference is cancelled in the first signal $V_1$. For example, the signal $i_2$ output from the second TX is cancelled.

The communication apparatus 100 or the RF chain 130 restores the desired signal $i_1$ through the first signal $V_1$ in which interference is cancelled.

Referring to FIG. 3, the parasitic element 120 is located close to the active element 110. For example, parasitic elements is located around an active element, or around active elements.

Figure 4:
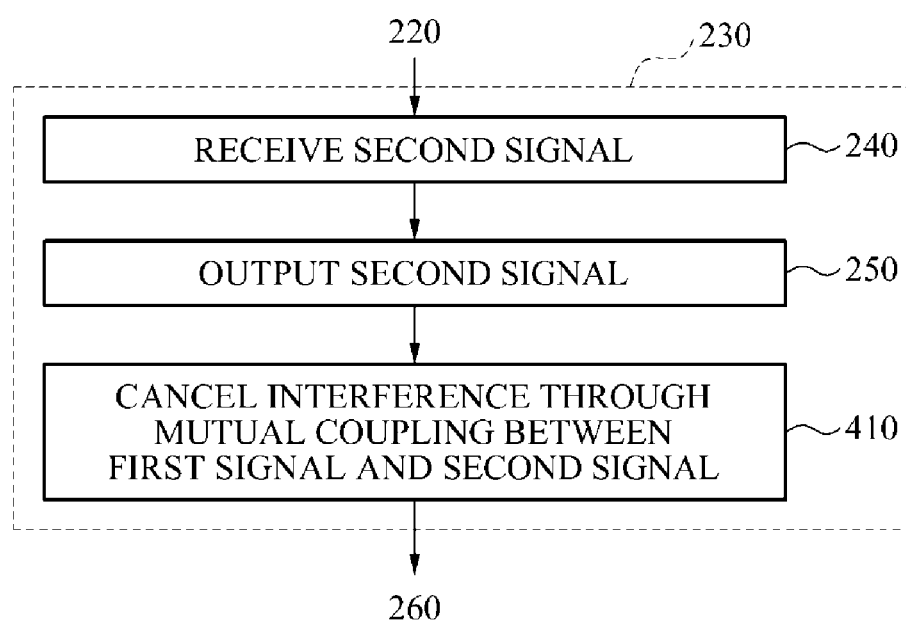
FIG. 4 is a flowchart illustrating an example of interference cancellation using mutual coupling, in accordance with an embodiment.

FIG. 4 illustrates an example of interference cancellation using mutual coupling, in accordance with an embodiment.

Operation 230 of FIG. 2 includes operations 240, 250, and 410 of FIG. 4.

The above-description of operations 230 through 250 of FIG. 2 is also applicable to the example of FIG. 4 and accordingly, will not be repeated here.

Referring to FIG. 4, in operation 410, the method, though the communication apparatus 100, the parasitic element 120, or the mutual coupling control circuit 310, cancels interference in the first signal $V_1$.

The method, through the communication apparatus 100, the parasitic element 120, or the mutual coupling control circuit 310, cancels interference through mutual coupling by the parasitic element 120 or the mutual coupling control circuit 310. For example, the interference is cancelled through mutual coupling between the first signal $V_1$ and the second signal $V_2$ by the mutual coupling control circuit 310.

The mutual coupling is performed by adjusting a value of the load impedance and a value of the mutual coupling of the mutual coupling control circuit 310.

The above-description of FIGS. 1 through 3 is also applicable to the example of FIG. 4 and accordingly, will not be repeated here.

Figure 5:
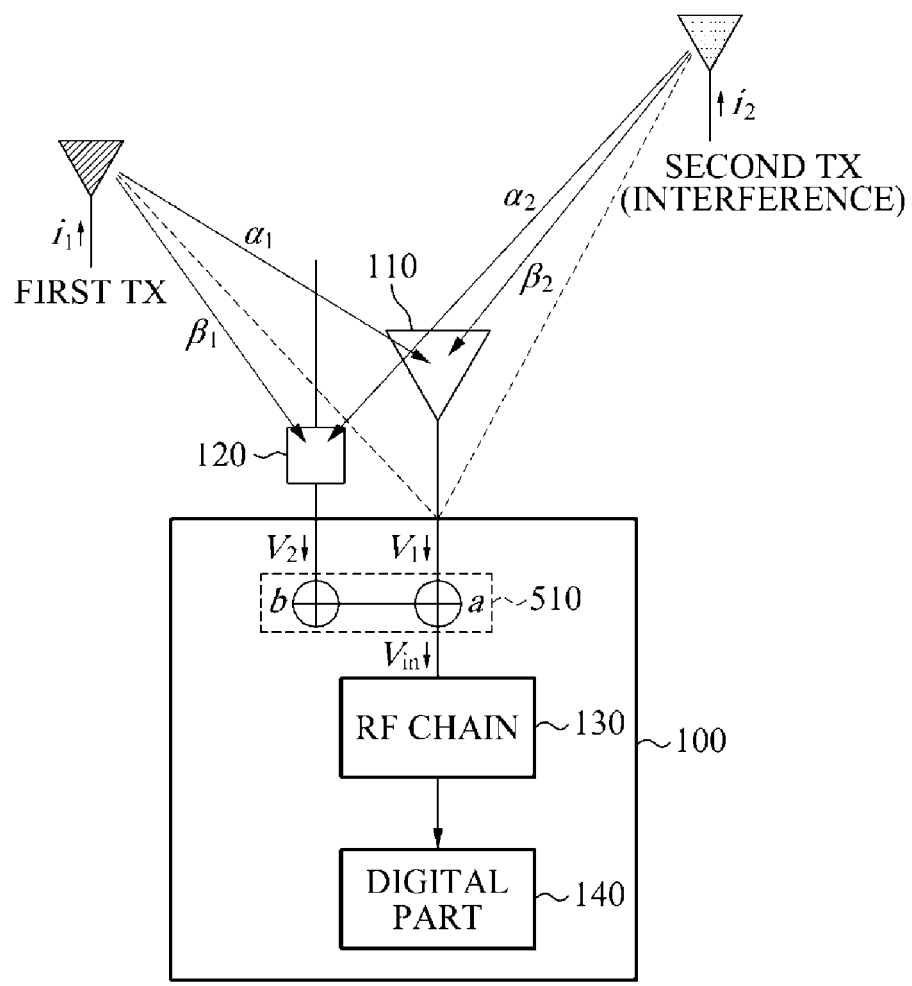
FIG. 5 is a diagram illustrating another example of the configuration of the communication apparatus to cancel interference using a phase shifter, in accordance with an embodiment.

FIG. 5 illustrates another example of the configuration of the communication apparatus 100 to cancel interference using a phase shifter, in accordance with an embodiment.

The above-description of the communication apparatus 100 with reference to FIGS. 1 through 4 is also applicable to the example of FIG. 5 and accordingly, will not be repeated here.

Referring to FIG. 5, in addition to the structural elements illustrated in FIG. 1, the communication apparatus 100 includes a phase shifter 510. The phase shifter 510 may be referred to as a phase combiner 510. The phase shifter 510 cancels an interference signal.

The phase shifter 510 receives the first signal $V_1$ and the second signal $V_2$ from the active element 110 and the parasitic element 120, respectively.

The phase shifter 510 shifts a phase of each of the first signal $V_1$ and the second signal $V_2$, and generates the third signal $V_{in}$ by combining the first signal $V_1$ and the second signal $V_2$ that have the shifted phases. The phase shifter 510 transmits the third signal $V_{in}$ to the RF chain 130.

The third signal $V_{in}$ may be calculated as shown in Equation 7 below.

$$V_{in}=aV_1+bV_2+n' \qquad \text{[Equation 7]}$$

In Equation 7, a denotes a value of a phase of the phase shifter 510 that is applied to the first signal $V_1$, and b denotes a value of a phase of the phase shifter 510 that is applied to the second signal $V_2$. In an example, a and b may be used as parameters of the phase shifter 510. In another example, a and b may be coefficients of a linear combination of the first signal $V_1$ and the second signal $V_2$ for phase shifting. a and b may be variable coefficients.

The communication apparatus 100 or the phase shifter 510 determines or adjusts the values a and b so that Equation 8 shown below may be satisfied with respect to the mutual coupling adjustment constant $\gamma$. The communication apparatus 100 or the phase shifter 510 cancels interference through the adjusting.

$$a(\alpha_2-\gamma\beta_2)+b(\beta_2-\gamma\alpha_2)=0 \qquad \text{[Equation 8]}$$

Additionally, as a result, the third signal $V_{in}$ in which interference is cancelled is calculated as shown in Equation 9 below.

$$V_{in}=\alpha'_1 i_1+n'' \qquad \text{[Equation 9]}$$

In Equation 9, n" denotes new noise after interference cancellation.

The above-description of FIGS. 1 through 4 is also applicable to the example of FIG. 5 and accordingly, will not be repeated here.

Figure 6:
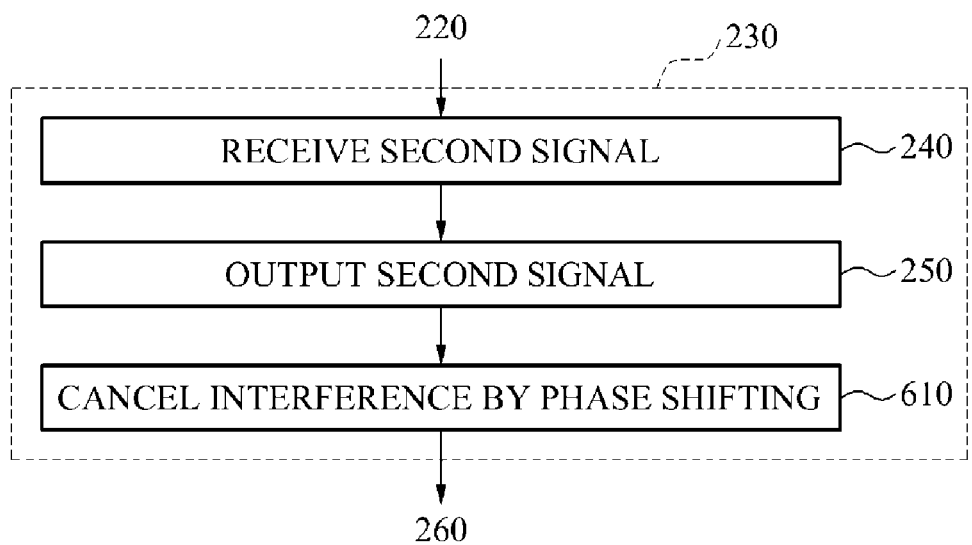
FIG. 6 is a flowchart illustrating an example of interference cancellation using a phase shifter, in accordance with an embodiment.

FIG. 6 illustrates an example of interference cancellation using a phase shifter, in accordance with an embodiment.

Operation 230 of FIG. 2 may include operations 240, 250, and 610 of FIG. 6.

The above-description of operations 230 through 250 of FIG. 2 is also applicable to the example of FIG. 6 and accordingly, will not be repeated here.

Referring to FIG. 6, in operation 610, the method applies, through the phase shifter 510, phase shifting to each of the first signal $V_1$ and the second signal $V_2$, and generates the third signal $V_{in}$.

For example, the method, through the phase shifter 510, shifts a phase of each of the first signal $V_1$ and the second signal $V_2$, so that interference may be cancelled. The method cancels the interference by adjusting the values a and b, and generates the third signal $V_{in}$, in which interference is cancelled, and as required by the communication apparatus 100.

The interference cancellation of FIG. 4, and the interference cancellation of FIG. 6 may be used alone or in combination. For example, operation 410 of FIG. 4 may be performed between operations 250 and 610.

The above-description of FIGS. 1 through 5 is also applicable to the example of FIG. 6 and accordingly, will not be repeated here.

Figure 7:
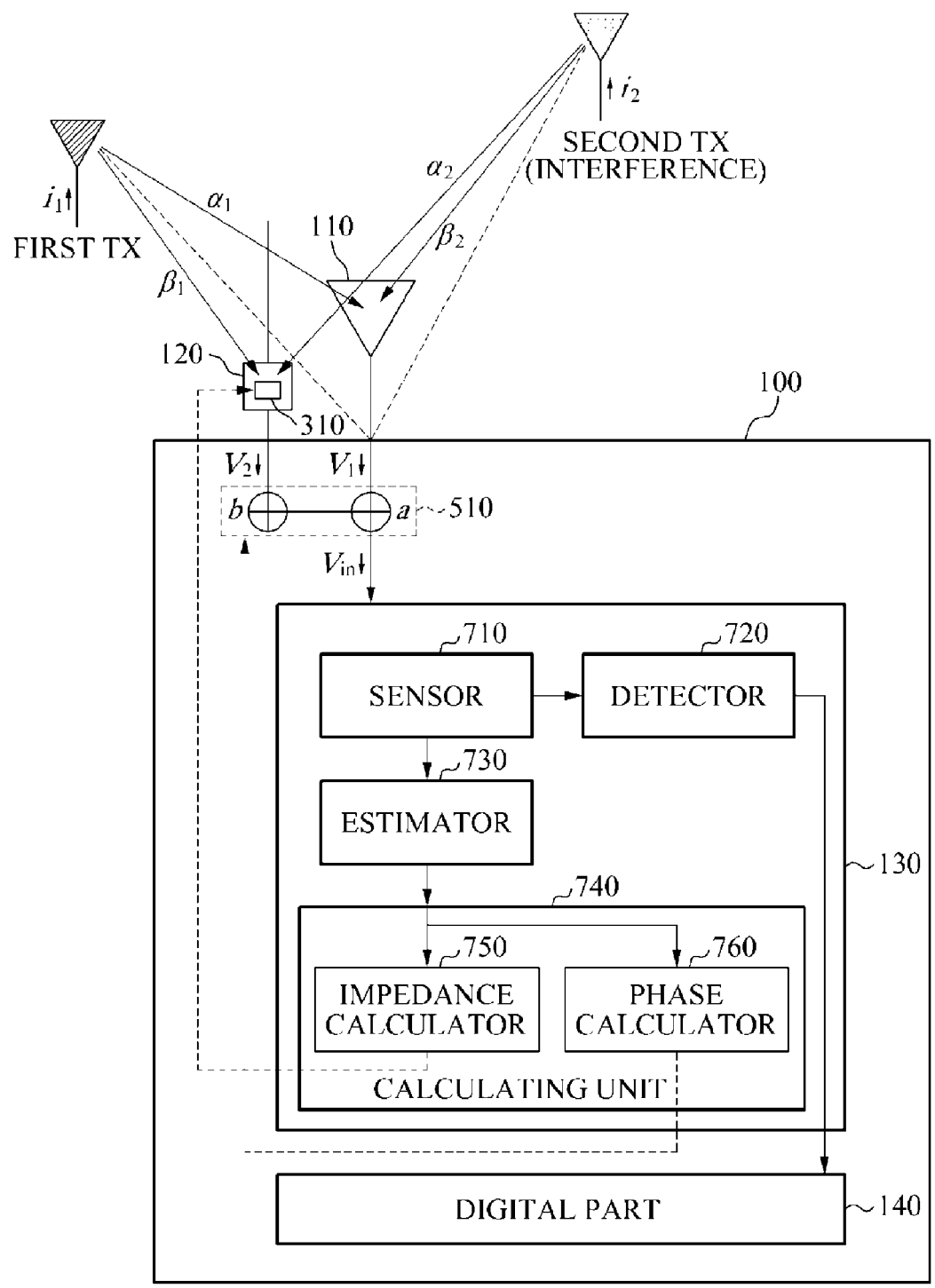
FIG. 7 is a diagram illustrating another example of the configuration of the communication apparatus using a parasitic element and a phase shifter, in accordance with an embodiment.

FIG. 7 illustrates another example of the configuration of the communication apparatus 100 using a parasitic element and a phase shifter, in accordance with an embodiment.

Referring to FIG. 7, the communication apparatus 100 further includes a sensor 710, a detector 720, an estimator 730, and a calculating unit 740. The RF chain 130 includes the sensor 710, the detector 720, the estimator 730, and the calculating unit 740.

The calculating unit 740 includes an impedance calculator 750, and a phase calculator 760.

The sensor 710 is configured to receive data and a reference signal used to estimate a channel. The detector 720 measures a channel based on a signal received by the active element 110. In an example, the detector 720 measures a channel based on the first signal $V_1$ or the third signal $V_{in}$. In this example, the first signal $V_1$ or the third signal $V_{in}$ is generated without appropriate interference cancellation. In another example, the detector 720 measures a channel based on the reference signal.

In accordance with an illustrative configuration, the expressions "measuring of a channel" and "estimating of a channel" may be interchangeably used with respect to each other. Additionally, "measuring of a channel" refer to determining of a channel by estimating the channel.

The impedance calculator 750, based on the measured channel, calculates a variable impedance suitable for interference control. For example, the impedance calculator 750 calculates the load impedance of the mutual coupling control circuit 310 or the parasitic element 120.

The calculated variable impedance is used to adjust the value $Z_L$, of FIG. 3.

The phase calculator 760 calculates a phase of the phase shifter 510 based on the calculated variable impedance and the measured channel. The phase have, for example, the values a and b of FIG. 5.

The communication apparatus 100 controls interference, for instance, by adjusting the load impedance of the parasitic element 120 to the calculated impedance or by adjusting the phase of the phase shifter 510 to the phase calculated. In a further alternative, the communication apparatus 100 uses the parasitic element 120, having the adjusted load impedance, to generate the third signal $V_{in}$ by cancelling interference in the first signal $V_1$ output from the active element 110. Additionally, the communication apparatus 100 may use the phase shifter 510, having the adjusted phase, to generate the third signal $V_{in}$ by cancelling interference in the first signal $V_1$ output from the active element 110.

As described above, the communication apparatus 100 configures and uses at least one of the parasitic element 120 and the phase shifter 510, to generate the third signal $V_{in}$ by cancelling interference in the first signal $V_1$ output from the active element 110.

The detector 720 decodes a signal desired by the communication apparatus 100, and generates a fourth signal that is to be input to the digital part 140. The fourth signal may be, for example, a digital signal. The detector 720 outputs the generated fourth signal to the digital part 140.

Figure 8:
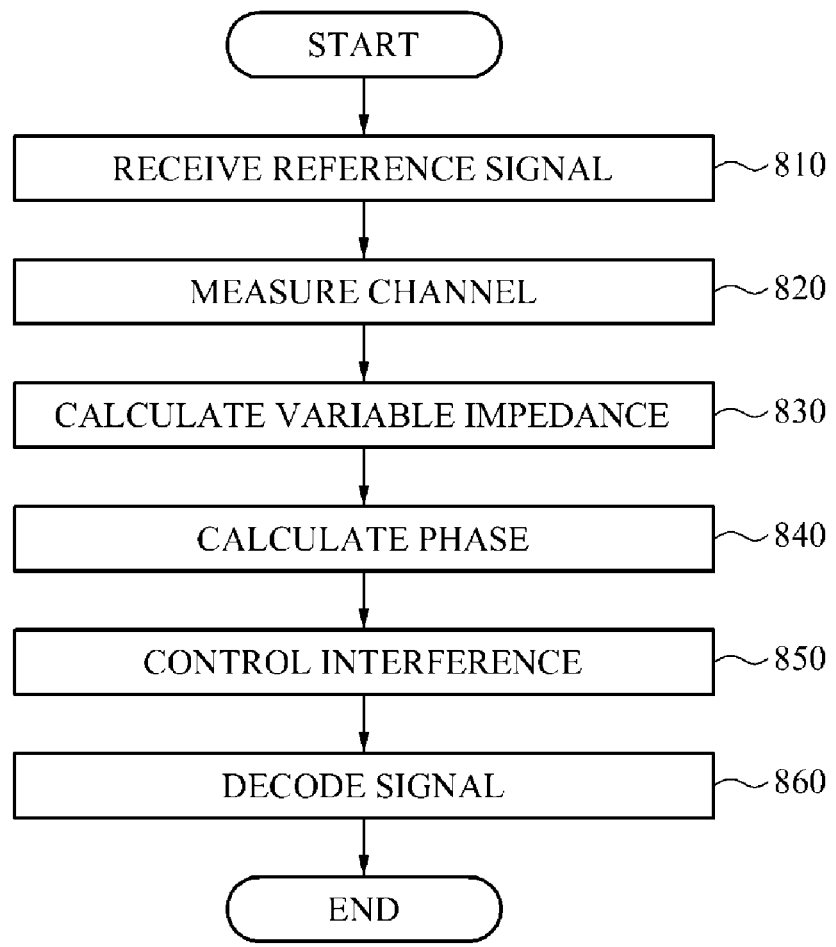
FIG. 8 is a flowchart illustrating an example of an operating method of a communication apparatus, in accordance with an embodiment.

FIG. 8 illustrates an operating method of the communication apparatus 100 of FIG. 7, in accordance with an embodiment.

Referring to FIG. 8, in operation 810, receiving at the sensor 710 data and the reference signal used to estimate a channel.

In operation 820, the method measures a channel based on a signal received at the active element 110. In an example, the method, using the detector 720, measures a channel based on the first signal $V_1$ or the third signal $V_{in}$. In this example, the first signal $V_1$ or the third signal $V_{in}$ may be generated without appropriate interference cancellation. In another example, the detector 720 may measure a channel based on the reference signal.

In accordance with an illustrative example, "measuring of a channel" and "estimating of a channel" may be interchangeably used with respect to each other. Additionally, "measuring of a channel" may refer to determining of a channel by estimating the channel.

The channel is periodically measured.

For example, a channel between the communication apparatus 100 and a TX, which outputs a signal required by the communication apparatus 100, is measured.

In operation 830, the method calculates a variable impedance suitable for interference control, based on the measured channel. For example, the load impedance of the mutual coupling control circuit 310 or the parasitic element 120 are calculated.

The method uses the calculated variable impedance to adjust the value $Z_L$, of FIG. 3.

In operation 840, the method calculates a phase of the phase shifter 510 based on the calculated variable impedance and the measured channel. The phase may have, for example, the values a and b of FIG. 5.

In operation 850, the method of the communication apparatus 100 controls interference.

Examples of interference control are described below.

In operation 830 or 850, the method adjusts the load impedance of the parasitic element 120 to the calculated impedance in operation 830.

In operation 840 or 850, the method adjusts the phase of the phase shifter 510 to the phase calculated in operation 840.

In operation 850, the method of the communication apparatus 100 uses the parasitic element 120 having the adjusted load impedance, to generate the third signal $V_{in}$ by cancelling interference in the first signal $V_1$ output from the active element 110.

Additionally, the method of the communication apparatus 100 uses the phase shifter 510 having the adjusted phase, to generate the third signal $V_{in}$ by cancelling interference in the first signal $V_1$ output from the active element 110.

As described above, the method of the communication apparatus 100 configures and uses at least one of the parasitic element 120 and the phase shifter 510, to generate the third signal $V_{in}$ by cancelling interference in the first signal $V_1$ output from the active element 110.

Operation 850 may correspond to a part or all of operations 210 through 280 of FIG. 2, for example, operations 210 through 250.

In operation 860, the method decodes a signal desired by the communication apparatus 100, and generates a fourth signal that is to be input to the digital part 140. The fourth signal may be, for example, a digital signal.

The communication apparatus 100 may desire to receive a signal output from the sensor 710, or the third signal $V_{in}$ of FIG. 2.

The method outputs the generated fourth signal to the digital part 140.

Operation 860 may correspond to operations 260 through 280 of FIG. 2.

A part or all of operations 210 through 280 corresponding to operation 850 may be performed prior to, or together with operations 810 through 840. For example, operation 810 includes at least one of operations 210 through 250. In this example, the reference signal, the first signal $V_1$ and the second signal $V_2$ may be simultaneously received in a single operation, or at a single point in time.

Figure 9:
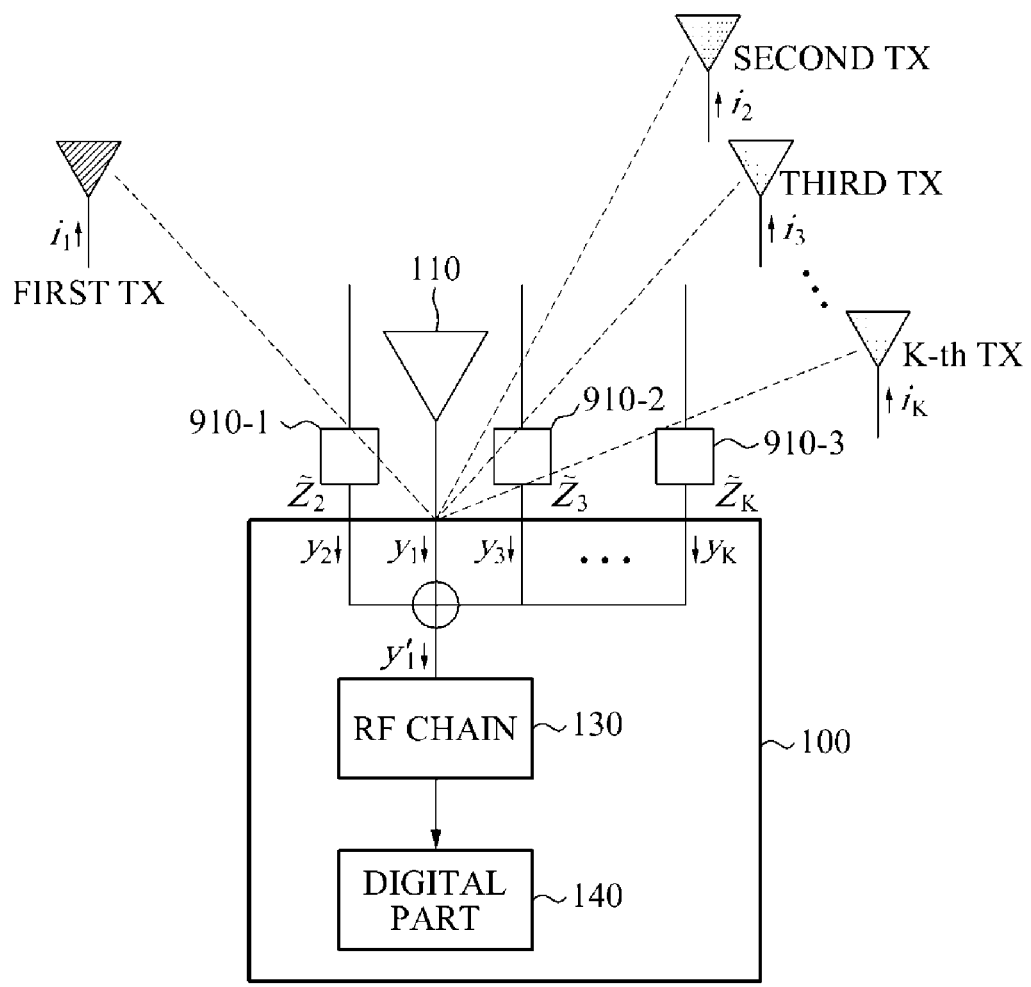
FIG. 9 is a diagram illustrating an example of the configuration of the communication apparatus to cancel interference caused by a plurality of transmitters (TXs), in accordance with an embodiment.

FIG. 9 illustrates an example of the configuration of the communication apparatus 100 to cancel interference caused by a plurality of TXs, in accordance with an embodiment.

Referring to FIG. 9, "K" TXs as a plurality of TXs may include, for example, a first TX through a K-th TX.

In FIG. 9, the first TX outputs a signal that the communication apparatus 100 as an RX desires to receive. The first TX corresponds to the communication apparatus 100. TXs other than the first TX, for example, a second TX through the K-th TX may refer to interference TXs. "K–1" interference TXs are provided in FIG. 9.

Referring to FIG. 9, a plurality of parasitic elements, for example, parasitic elements 910-1, 910-2, and 910-3 may be used by the communication apparatus 100.

A number of the plurality of parasitic elements may be equal to or greater than a number of interference TXs. Accordingly, "K–1" parasitic elements are provided in FIG. 9.

The communication apparatus 100 uses the plurality of parasitic elements to generate the third signal $V_{in}$ by cancelling interference in the first signal $V_1$ received by the active element 110.

Referring to FIG. 9, a signal $y_1$ output from the active element 110 corresponds to the first signal $V_1$, and a signal $y_1$ input to the RF chain 130 corresponds to the third signal $V_{in}$. Each of signals $y_2$ to $y_K$ output from the plurality of parasitic elements corresponds to the second signal $V_2$.

A plurality of second signals $V_2$ are provided, and respectively corresponds to signals output from the plurality of parasitic elements. For example, the plurality of second signals may respectively correspond to the signals $y_2$ to $y_K$.

Each of the plurality of parasitic elements includes a mutual coupling control circuit. The mutual coupling control circuit has a value of mutual coupling. Referring to FIG. 9, values of mutual coupling of the "K−1" parasitic elements are denoted by $\tilde{Z}_2$, $\tilde{Z}_3$, and $\tilde{Z}_K$, respectively.

Each of the values $\tilde{Z}_2$, $\tilde{Z}_3$, and $\tilde{Z}_K$ may correspond to the value $\tilde{Z}_{12}$.

To cancel interference, the communication apparatus 100 overcomes an influence of mutual coupling by adjusting a value of a load impedance and a value of mutual coupling of a mutual coupling control circuit of each of the plurality of parasitic elements.

Additionally, the communication apparatus 100 sets the value of the interference control coefficient γ as shown in Equation 5 above, by adjusting a value of a load impedance and a value of mutual coupling of a mutual coupling control circuit of each of the plurality of parasitic elements.

The phase shifter 510 of FIG. 5 is used when the plurality of parasitic elements are used.

The phase shifter 510 receives the signal $y_1$ from the active element 110, and receives the signals $y_2$ to $y_K$ from the plurality of parasitic elements.

The phase shifter 510 shifts a phase of each of the signals $y_1$ to $y_K$, and cancels interference. The phase shifter 510 generates the signal $y_1$ by combining the signals $y_1$ to $y_K$ having the shifted phases. The phase shifter 510 transmits the signal $y_1$ to the RF chain 130.

The phase shifter 510 applies phase shifting to each of the signals $y_1$ to $y_K$, and generates the signal $y_1$.

As described above, the signals $y_2$ to $y_K$ respectively correspond to the plurality of second signals $V_2$. For example, when the plurality of second signals $V_2$ are received at the plurality of parasitic elements, the phase shifter 510 applies phase shifting to each of the first signal $V_1$ and the second signals $V_2$, and generates the third signal $V_{in}$.

The phase shifter 510 adjusts or determines values of coefficients of a linear combination of the signals $y_1$ to $y_K$ for phase shifting. The phase shifter 510 cancels interference through the adjusting.

The above-description of FIGS. 1 through 8 is also applicable to the example of FIG. 9 and accordingly, will not be repeated here.

Figure 10:
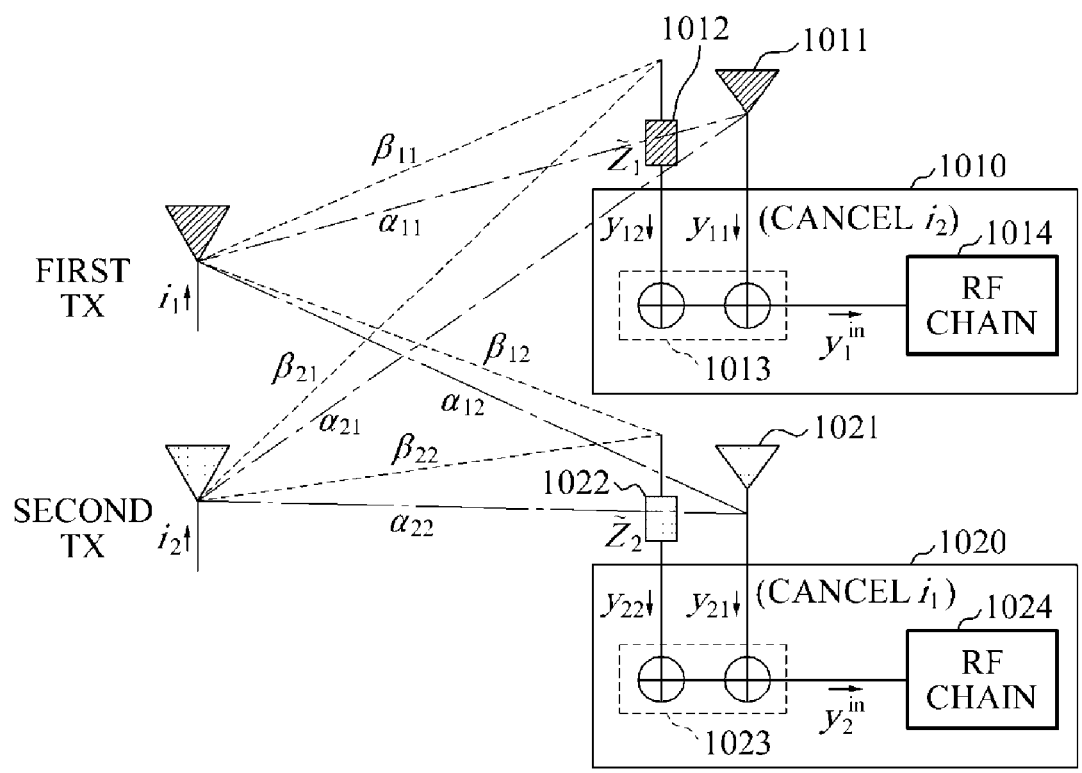
FIG. 10 is a diagram illustrating an example of a multi-user multiple-in and multiple-out (MU-MIMO) communication system, in accordance with an embodiment.

FIG. 10 illustrates an example of a multi-user multiple-in and multiple-out (MU-MIMO) communication system, in accordance with an embodiment.

The MU-MIMO communication system includes at least one TX and at least one RX. Each of the at least one RX corresponds to the communication apparatus 100.

In the MU-MIMO communication system, an RF may be used.

Referring to FIG. 10, the MU-MIMO communication system includes a first TX, a second TX, a first RX 1010, and a second RX 1020. In one configuration, the first TX and the first RX 1010 communicate with each other, and the second TX and the second RX 1020 communicate with each other. For example, the first TX corresponds to the first RX 1010, and the second TX interferes with the first RX 1010.

Each of the first TX and the second TX includes an active element and an RF chain. The first TX corresponds to the communication apparatus 100. For example, the TX corresponds to the communication apparatus 100 configured to transmit a signal.

The parasitic element 120 of the communication apparatus 100 may also be applied in the MU-MIMO communication system.

The first TX outputs a signal $i_1$. The signal $i_1$ is, for example, a signal that the first TX desires to transmit to the first RX 1010, or a signal that the first RX 1010 desires to receive.

The second TX outputs a signal $i_2$. The signal $i_2$ is, for example, a signal that the second TX desires to transmit to the second RX 1020, or a signal that the second RX 1020 desires to receive.

Each of the at least one RX in the MU-MIMO communication system regards signals, other than a signal that each of the at least one RX desires to receive, as interference signals.

Because an apparatus interfering with each of the at least one RX exists, each of a plurality of communication apparatuses, for example the communication apparatus 100, may use a parasitic element of each of the communication apparatuses, for example parasitic element 120. The communication apparatus 100 would use the parasitic element 120 to generate a third signal by cancelling interference in a first signal received by an active element of each of the communication apparatuses, for example the active element 110.

Each of an active element 1011 of the first RX 1010, and an active element 1021 of the second RX 1020 corresponds to the above-described active element 110. Each of a parasitic element 1012 of the first RX 1010, and a parasitic element 1022 of the second RX 1020 corresponds to the above-described parasitic element 120. Each of a value $\tilde{Z}_1$ of mutual coupling of the parasitic element 1012, and a value $\tilde{Z}_2$ of mutual coupling of the parasitic element 1022 corresponds to the above-described value $\tilde{Z}_{12}$.

In FIG. 10, the active element 1011 receives a signal $y_{11}$, and the parasitic element 1012 receives a signal $y_{12}$. The active element 1021 receives signal $y_{21}$, and the parasitic element 1022 receives a signal $y_{22}$. Each of the signals $y_{11}$ and $y_{21}$ correspond to the first signal Each of the signals $y_{12}$ and $y_{22}$ correspond to the second signal $V_2$.

Additionally, each of signals $y_1^{in}$ and $y_2^{in}$ are generated by cancelling interference. The first RX 1010 generates the signal $y_1^{in}$ by applying interference cancellation using the signal $y_{12}$ to the signal $y_{11}$. The second RX 1020 generates the signal $y_2^{in}$ by applying interference cancellation using the signal $y_{22}$ to the signal $y_{21}$.

The value $\tilde{Z}_1$ is used by the first RX 1010 to cancel an interference signal. The value $\tilde{Z}_2$ is used by the second RX 1020 to cancel an interference signal.

Each of a phase shifter 1013 of the first RX 1010 and a phase shifter 1023 of the second RX 1020 corresponds to the above-described phase shifter 510.

The phase shifter 1013 applies phase shifting to each of the signals $y_{11}$ and $y_{12}$, received at the active element 1011 and the parasitic element 1012, respectively, and generates the signal $y_1^{in}$ to be input to an RF chain 1014. The phase shifter 1023 applies phase shifting to each of the signals $y_{21}$ and $y_{22}$ received at the active element 1021 and the parasitic element 1022, respectively, and generates the signal $y_2^{in}$ to be input to an RF chain 1024.

The signals $y_{11}$, $y_{12}$ and $y_1^{in}$ are respectively calculated as shown in Equations 10, 11 and 12 below.

$$y_{11}=\Gamma_1(\alpha_{11}i_1+\alpha_{21}i_2++n_{11}+\gamma_1(\beta_{11}i_1+\beta_{21}i_2+n_{12}))$$ [Equation 10]

$$y_{12}=\Gamma_1(\beta_{11}i_1+\beta_{21}i_2+n_{12}-\gamma_1(\alpha_{11}i_1+\alpha_{21}i_2+n_{11}))$$ [Equation 11]

$$y_1{}^{in}=\alpha'_{11}i_1+n''_1$$ [Equation 12]

In Equations 10 through 12, $\alpha_{11}$ denotes a channel coefficient of a channel between the first TX and the active element 1011. The first TX operates as a corresponding TX to transmit a signal that the first RX 1010 desires to receive. Additionally, $\alpha_{21}$ denotes a channel coefficient of a channel between the second TX and the active element 1011. The second TX operates as an interference TX to transmit an interference signal to the first RX 1010.

In addition, $\beta_{11}$ denotes a channel coefficient of a channel between the first TX and the parasitic element 1012, and $\beta_{21}$ denotes a channel coefficient of a channel between the second TX and the parasitic element 1012.

$n_{11}$ denotes noise in the active element 1011, and $n_{12}$ denotes noise in the parasitic element 1012.

$\alpha'_{11}$ denotes a new channel coefficient of the channel between the first TX and the active element 1011 after interference cancellation.

$n'_1$ denotes noise in the active element 1011 after interference cancellation.

$\gamma_1$ denotes an interference control coefficient of the first RX 1010.

A coefficient $\Gamma_i$ may be defined as shown in Equation 13 below.

$$\Gamma_i = \frac{1}{1-\gamma_i^2}$$ [Equation 13]

The signals $y_{21}$, $y_{22}$ and $y_2{}^{in}$ may be respectively calculated as shown in Equations 14, 15 and 16 below.

$$y_{21}=\Gamma_1(\alpha_{12}i_1+\alpha_{22}i_2++n_{21}+\gamma_1(\beta_{12}i_1+\beta_{22}i_2+n_{22}))$$ [Equation 14]

$$y_{22}=\Gamma_2(\beta_{12}i_1+\beta_{22}i_2+n_{22}-\gamma_2(\alpha_{12}i_1+\alpha_{22}i_2+n_{21}))$$ [Equation 15]

$$y_2{}^{in}=\alpha'_{22}i_2+n''_2$$ [Equation 16]

In Equations 14 through 16, $\alpha_{22}$ denotes a channel coefficient of a channel between the second TX and the active element 1021. The second TX operates as a corresponding TX to transmit a signal that the second RX 1020 desires to receive. Additionally, $\alpha_{12}$ denotes a channel coefficient of a channel between the first TX and the active element 1021. The first TX operates as an interference TX to transmit an interference signal to the second RX 1020.

$\beta_{22}$ denotes a channel coefficient of a channel between the second TX and the parasitic element 1022, and $\beta_{12}$ denotes a channel coefficient of a channel between the first TX and the parasitic element 1022.

$n_{21}$ Denotes noise in the active element 1021, and $n_{22}$ denotes noise in the parasitic element 1022.

$\alpha'_{21}$ denotes a new channel coefficient of the channel between the second TX and the active element 1021 after interference cancellation.

$n''_2$ denotes noise in the active element 1021 after interference cancellation.

$\gamma_2$ denotes an interference control coefficient of the second RX 1020.

Referring to Equation 12, the signal $y_1{}^{in}$ may be determined to be independent of the signal $i_2$ that interferes with the first RX 1010. Additionally, referring to Equation 16, the signal $y_2{}^{in}$ may be determined to be independent of the signal $i_1$ that interferes with the second RX 1020. For example, when "K" TX/RX pairs are formed, the communication apparatus 100 simultaneously transmits and receives data, together with TX/RX pairs other than a TX/RX pair including the communication apparatus 100, using "K−1" parasitic elements, instead of using channel state information at the transmitter (CSIT). In this example, the communication apparatus 100 operating as an RX may cancel interference caused by TXs of the other TX/RX pairs in an RF domain, using a parasitic element.

Each of the RF chains 1014 and 1024 corresponds to the above-described RF chain 130.

The RF chains 1014 and 1024 receives the signals $y_1{}^{in}$ and $y_2{}^{in}$, respectively. Each of the signals $y_1{}^{in}$ and $y_2{}^{in}$ corresponds to the third signal $V_{in}$.

The first RX 1010 performs interference cancellation on a signal received at the active element 1011 using the parasitic element 1012 and the phase shifter 1013. Also, the first RX 1010 decodes the signal $i_1$, in which the signal $i_2$ interfering with the first RX 1010 is cancelled, through the interference cancellation. Additionally, the second RX 1020 performs interference cancellation on a signal received at the active element 1021 using the parasitic element 1022 and the phase shifter 1023. The second RX 1020 also decodes the signal $i_2$ in which the signal $i_1$ interfering with the second RX 1020 is cancelled through the interference cancellation.

In the MU-MIMO communication system, a plurality of active elements, and a plurality of RF chains are included in the communication apparatus 100. A number of the plurality of active elements, and a number of the plurality of RF chains may be equal to a number of signals that the communication apparatus 100 desires to receive. Based on the number of the plurality of active elements, a plurality of first signals $V_1$, a plurality of second signals $V_2$, and a plurality of third signals $V_{in}$ are generated. The number of active elements, and the number of the RF chains may be equal to a number of the plurality of third signals $V_{in}$ simultaneously generated by the communication apparatus 100.

Two TXs and two RXs are described above with reference to FIG. 10, however there is no limitation thereto. For example, the MU-MIMO communication system of FIG. 10 may include at least three TXs and at least three RXs corresponding to the at least three TXs. In this example, each of the RXs includes the same number of parasitic elements as a number of TXs other than a TX that transmits a signal desired by each of the RXs among signals output from different TXs, to cancel signals other than the desired signal. For example, each of the RXs may include "n−1" parasitic elements, and n may indicate a number of TXs.

Additionally, some of the TXs may not output a signal. For example, some of the TXs may output a signal for corresponding RXs. In this example, a number of TXs that output signals among the TXs may be equal to a number of RXs. Each of the RXs may include the same number of parasitic elements as a number of RXs to cancel signals other than a signal desired by each of the RXs, among signals output from different TXs. For example, each of the plurality of RXs may include "m−1" parasitic elements, where m indicates a number of the RXs.

As described above, the parasitic element 120 enables a single RX to cancel interference using a signal for another RX in an RF domain. In the above-described examples, open-loop MU-MIMO may be realized using a single RF chain and parasitic elements, instead of using an RX including a plurality of RF chains.

The above-description of FIGS. 1 through 9 is also applicable to the example of FIG. 10 and accordingly, will not be repeated here.

Figure 11:
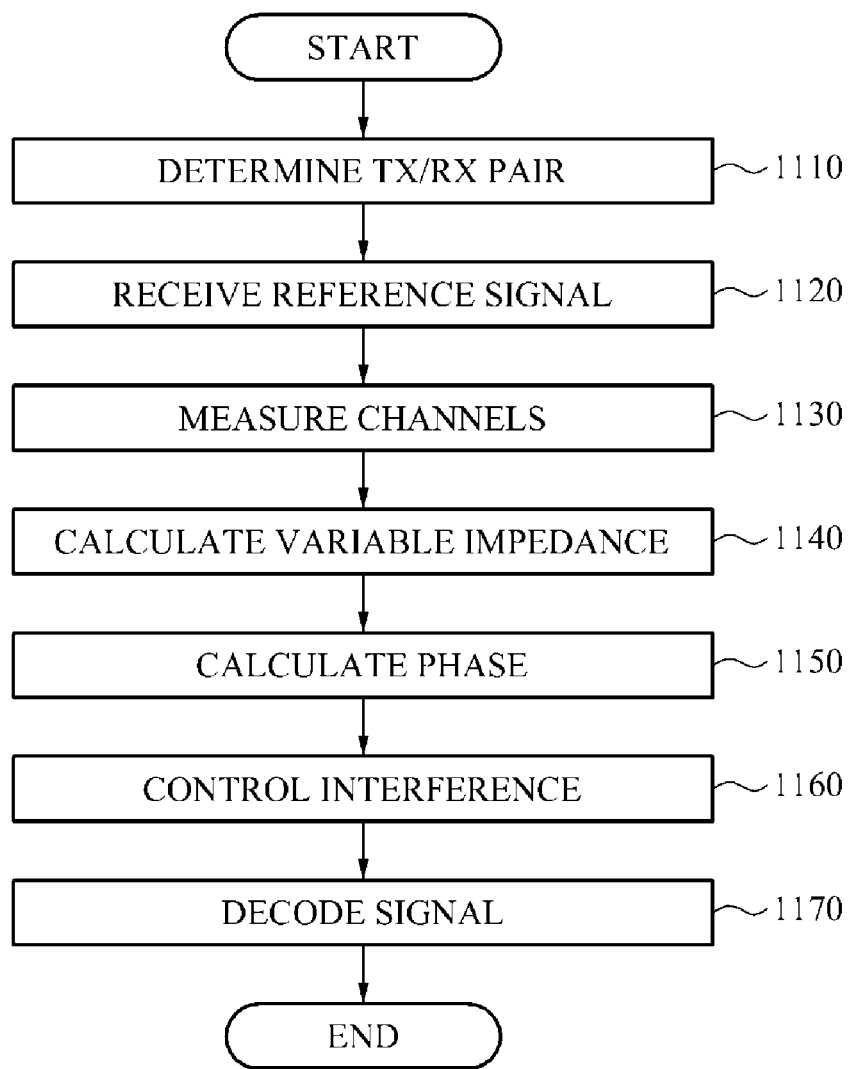
FIG. 11 is a flowchart illustrating an example of an operating method of the MU-MIMO communication system, in accordance with an embodiment.

FIG. 11 illustrates an example of an operating method of a MU-MIMO communication system, in accordance with an embodiment.

The MU-MIMO communication system includes at least one TX and at least one RX. Each of the at least one RX corresponds to the communication apparatus 100. The communication apparatus 100 may function as a TX or an RX. For example, the MU-MIMO communication system may include at least one communication apparatus, and each of the at least one communication apparatus may function as a TX or an RX.

For illustrative purposes and to maintain the description of FIG. 11 simple, one pair of TX/RX, one TX and one RX will be described. However, the MU-MIMO communication system may include a plurality of TX/RX pairs, a plurality of TXs, and a plurality of RXs. Referring to FIG. 11, in operation 1110, the method determines using a TX/RX pair of the TX and the RX for transmission and reception is determined. For example, each of the at least one communication apparatus may function as either a TX or an RX, and a communication apparatus operating as a TX may be paired with a communication apparatus operating as an RX.

Hereinafter, an operation of a communication apparatus operating as an RX among the at least one communication apparatus in the MU-MIMO communication system, for example, the communication apparatus 100 of FIG. 7, will be further described. The communication apparatus 100 may function as an RX in a TX/RX pair.

In operation 1120, the method receives data and a reference signal at the sensor 710 to estimate a channel.

In operation 1130, the method measures, using the detector 720, channels based on a signal received by the active element 110. For example, channels between the active element 110 and each of the at least one TX are measured. The method using the detector 720 measures channels between the active element 110 and each of the at least one TX in the MU-MIMO communication system, based on the signal received at the active element 110.

In an example, the method, using the detector 720, measures a channel based on the first signal $V_1$ or the third signal $V_{in}$. In this example, appropriate interference cancellation may not be performed on the first signal $V_1$ or the third signal $V_{in}$. In another example, the method, using the detector 720, measures a channel based on the reference signal.

The method, using the detector 720, estimates a channel between the communication apparatus 100 and a TX corresponding to the communication apparatus 100 as well as channels between the other TXs and the RXs formed as the other pairs.

In operation 1140, the method, using the impedance calculator 750, calculates a variable impedance suitable for interference control, based on the measured channels. For example, the load impedance of the mutual coupling control circuit 310 of FIG. 3 may be calculated.

The method, using the impedance calculator 750, calculates a load impedance used to cancel signals received from the other TXs. The other TXs may be included in TX/RX pairs other than a TX/RX pair between the communication apparatus 100 and the TX corresponding to the communication apparatus 100.

The calculated variable impedance may be used to adjust the value $Z_L$ of FIG. 3.

In operation 1150, the method, using the phase calculator 760, calculates the phase of the phase shifter 510 based on the calculated variable impedance and the measured channels.

In operation 1160, the method, using the communication apparatus 100, controls interference. The method cancels interference signals received from the other TXs.

The method using the impedance calculator 750 and the phase calculator 760 performs calculation based on all the measured channels and; accordingly, in an environment in which various interferences occur. The method is configured to decode a signal desired by the communication apparatus 100 using a single RF chain, for example the RF chain 130.

Operation 1160 may correspond to a part or all of operations 210 through 280 of FIG. 2, for example, operations 210 through 250. Additionally, a part or all of operations 210 through 280 may be expanded in association with a plurality of TXs, as described above with reference to FIGS. 9 and 10.

When the interference signals are cancelled, the method, using the detector 720, decodes the signal desired by the communication apparatus 100, and generates a fourth signal to be input to the digital part 140 in operation 1170. The fourth signal may be, for example, a digital signal.

For example, the communication apparatus 100 may desire to receive a signal output from the sensor 710, or the third signal $V_{in}$ of FIG. 2. Additionally, the communication apparatus 100 may desire to receive the signal $y'_1$ of FIG. 9, and one of the signals $y_1^{in}$ and $y_2^{in}$ of FIG. 10.

The method using the detector 720 outputs the generated fourth signal to the digital part 140.

Operation 1170 may correspond to operations 260 through 280 of FIG. 2.

A part or all of operations 210 through 280 corresponding to operation 1160 may be performed prior to, or together with operations 1120 through 1150. For example, operation 1120 may include at least one of operations 210 through 250.

Figure 12:
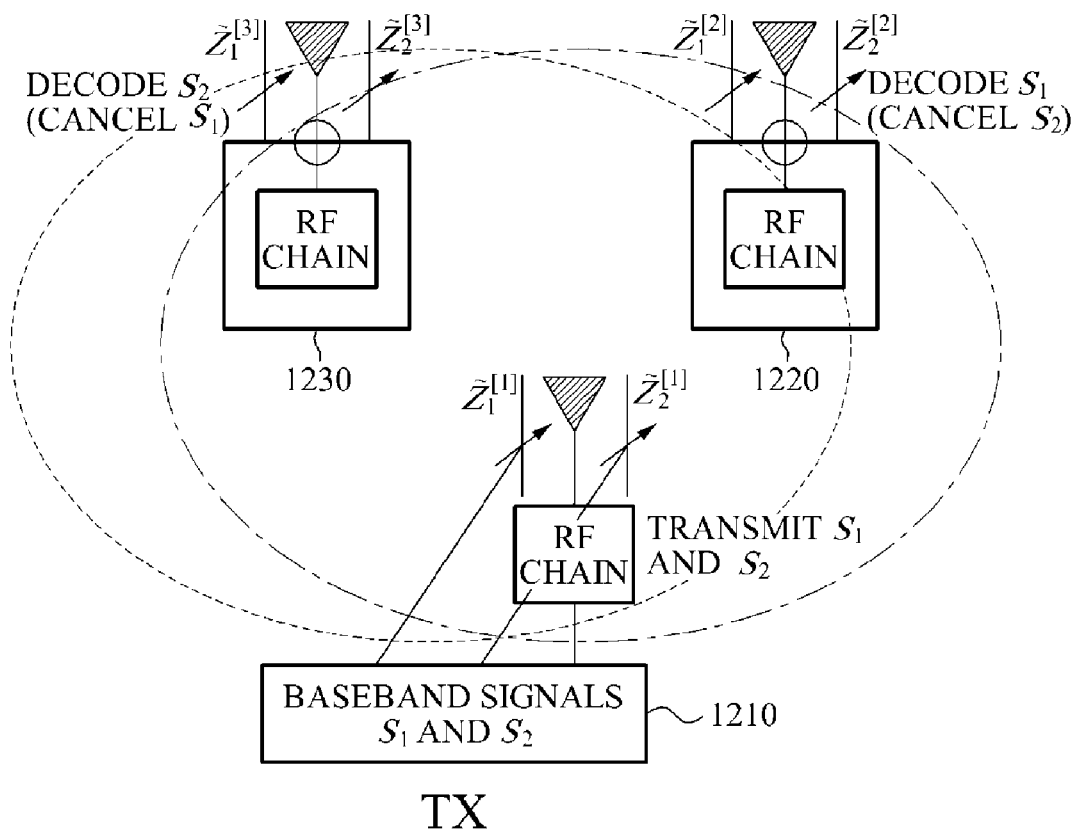
FIG. 12 is a diagram illustrating an example of the MU-MIMO communication system with a TX configured to output a plurality of signals, in accordance with an embodiment.

FIG. 12 illustrates an example of a MU-MIMO communication system with a TX to output a plurality of signals, in accordance with an embodiment.

The MU-MIMO communication system includes at least one communication apparatus, for example, the communication apparatus 100.

Each communication apparatus operates as at least one of a TX and an RX.

Referring to FIG. 12, the MU-MIMO communication system includes a first communication apparatus 1210, a second communication apparatus 1220, and a third communication apparatus 1230. In one illustrative example, the first communication apparatus 1210 operates as a TX, and the second communication apparatus 1220 and the third communication apparatus 1230 operate as RXs.

The first communication apparatus 1210 as a TX selects RXs to which a signal is to be transmitted from among the communication apparatus in the MU-MIMO communication system. In FIG. 12, the second communication apparatus 1220 and the third communication apparatus 1230 may be selected as an RX to which a signal $S_1$ is to be transmitted, and an RX to which a signal $S_2$ is to be transmitted, respectively.

The first communication apparatus 1210 transmits the signals $S_1$ and $S_2$ through an active element, for example the active element 110. In FIG. 12, the first communication apparatus 1210 transmits baseband signals, that is, the signals $S_1$ and $S_2$. The signals $S_1$ and $S_2$ are desired by the second communication apparatus 1220 and the third communication apparatus 1230, respectively.

The second communication apparatus 1220, as a first RX, performs interference cancellation on a signal received at an active element, and decodes the signal $S_1$ after the signal $S_2$ interfering with the second communication apparatus 1220 is cancelled through the interference cancellation. Additionally, the third communication apparatus 1230, as a second RX, performs interference cancellation on a signal received at an active element, and decodes the signal 82 after the signal $S_1$ interfering with the third communication apparatus 1230 is cancelled through the interference cancellation.

Each communication apparatus transmits multiple signals at the same time, or may acquire a desired signal among the multiple signals, by controlling a parasitic element, for example, the parasitic element 120. The multiple signals may represent multiple streams.

Each of the at least one communication apparatus may include two parasitic elements.

In FIGS. 12, $\tilde{Z}_1^{[1]}$ and $\tilde{Z}_2^{[2]}$ denote values of mutual coupling of parasitic elements of the first communication apparatus 1210. The values $\tilde{Z}_1^{[1]}$ and $\tilde{Z}_2^{[2]}$ are used to transmit the signals $S_1$ and $S_2$ by the first communication apparatus 1210. $\tilde{Z}_1^{[2]}$ and $\tilde{Z}_2^{[2]}$ denote values of mutual coupling of parasitic elements of the second communication apparatus 1220. The values $\tilde{Z}_1^{[2]}$ and $\tilde{Z}_2^{[2]}$ are used to cancel interference signals by the second communication apparatus 1220. $\tilde{Z}_1^{[3]}$ and $\tilde{Z}_2^{[3]}$ denote values of mutual coupling of parasitic elements of the third communication apparatus 1230. The values $\tilde{Z}_1^{[3]}$ and $\tilde{Z}_2^{[3]}$ are used to cancel interference signals by the third communication apparatus 1230.

For example, the second communication apparatus 1220 decodes the signal $S_1$ by cancelling the signal $S_2$ interfering with the second communication apparatus 1220 in a received first signal $V_1$. The second communication apparatus 1220 adjusts values of mutual coupling of a plurality of parasitic elements of the second communication apparatus 1220 to the values $\tilde{Z}_1^{[2]}$ and $\tilde{Z}_2^{[2]}$, respectively. Additionally, the third communication apparatus 1230 decodes the signal $S_2$ by cancelling the signal $S_1$ interfering with the third communication apparatus 1230 in a received first signal $V_1$ by adjusting values of mutual coupling of a plurality of parasitic elements of the third communication apparatus 1230 to the values $\tilde{Z}_1^{[3]}$ and $\tilde{Z}_2^{[3]}$ respectively.

The above-description of FIGS. 1 through 11 is also applicable to the example of FIG. 12 and accordingly, will not be repeated here.

Figure 13:
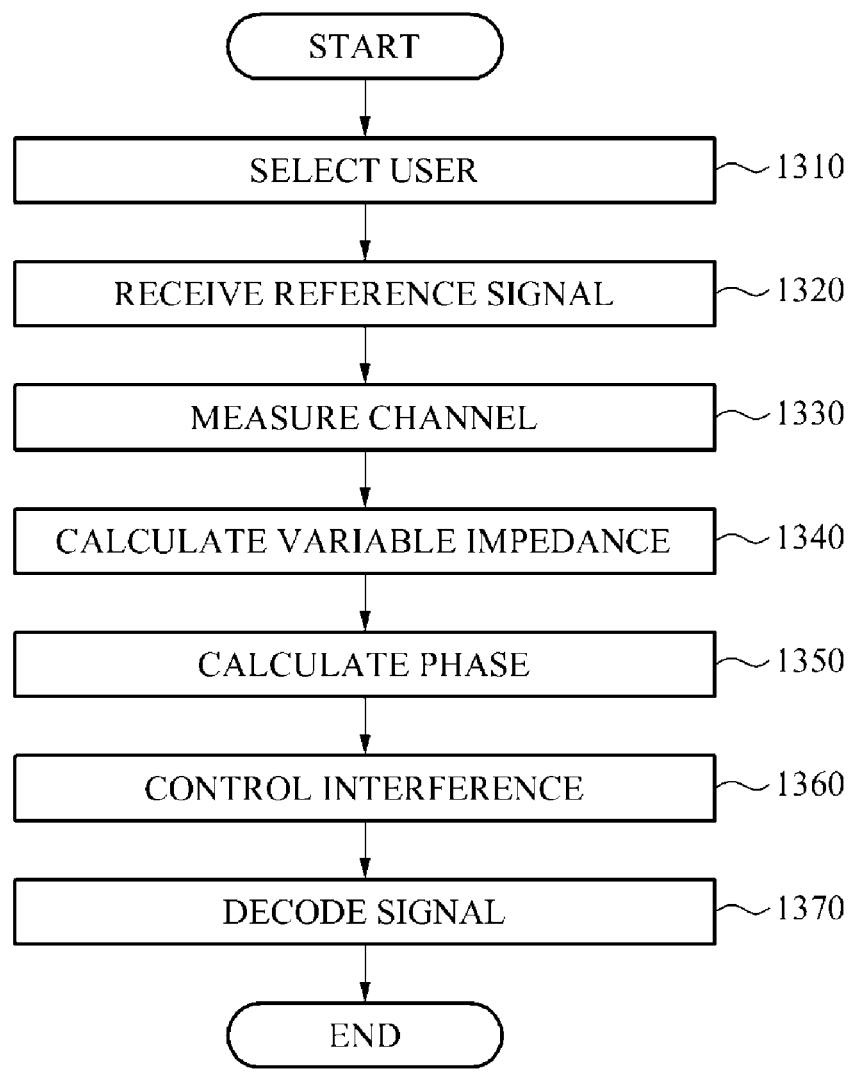
FIG. 13 is a flowchart illustrating an example of an operating method of the MU-MIMO communication system with a TX configured to output a plurality of signals, in accordance with an embodiment.

FIG. 13 illustrates an example of an operating method of a MU-MIMO communication system with a TX to output a plurality of signals, in accordance with an embodiment.

The TX in the MU-MIMO communication system transmits a plurality of signals to a plurality of RXs, respectively.

Referring to FIG. 13, in operation 1310, the method, at the TX, selects a user in the MU-MIMO communication system. The user may be, for example, a user of an RX. For example, the TX may select an RX to which a signal is to be transmitted from among RXs in the MU-MIMO communication system. A plurality of users, or a plurality of RXs may be selected.

Each of the selected RXs may be, for example, the communication apparatus 100. Hereinafter, an operation of a communication apparatus as an RX among the RXs, for example the communication apparatus 100 of FIG. 7, will be further described.

In operation 1320, the method, through the sensor 710, receives data and a reference signal used to estimate a channel.

In operation 1330, the method, using the detector 720, measures a channel based on a signal received by the active element 110. For example, the method measures a channel between the TX and the communication apparatus 100. The method, using the detector 720, measures a channel between the communication apparatus 100 and the TX in the MU-MIMO communication system, based on the signal received by the active element 110.

In an example, the method, using the detector 720, measures a channel based on the first signal $V_1$ or the third signal $V_{in}$. In this example, the method may not perform appropriate interference cancellation on the first signal $V_1$ or the third signal $V_{in}$. In another example, the method configures the detector 720 to measure a channel based on the reference signal.

In operation 1340, the method, using the impedance calculator 750, calculates a variable impedance suitable for interference control, based on the measured channel. For example, the load impedance of the mutual coupling control circuit 310 of FIG. 3 is calculated.

The method, using the impedance calculator 750, calculates a load impedance used to cancel an interference signal. The interference signal refers to at least one signal, other than a signal that the communication apparatus 100 desires to receive, among a plurality of signals output from the TX. A plurality of first signals $V_1$ may be generated by the TX, and the third signal $V_{in}$ may be generated by cancelling signals other than a signal that the communication apparatus 100 desires to receive among a plurality of signals.

The calculated variable impedance is used to adjust the value $Z_L$, of FIG. 3.

In operation 1350, the method using the phase calculator 760 calculates the phase of the phase shifter 510, based on the calculated variable impedance and the measured channel.

In operation 1360, the method at the communication apparatus 100 controls interference. The method cancels interference signals received from other TXs.

Operation 1360 may correspond to a part or all of operations 210 through 280 of FIG. 2, for example, operations 210 through 250. Additionally, a part or all of operations 210 through 280 may be expanded in association with a plurality of TXs, as described above with reference to FIGS. 9 and 10.

When the interference signals are cancelled, the method, through the decoder 720, decodes a signal desired by the communication apparatus 100, and generates a fourth signal to be input to the digital part 140 in operation 1370. The fourth signal may be, for example, a digital signal.

For example, the communication apparatus 100 may desire to receive a signal output from the sensor 710, or the third signal $V_{in}$ of FIG. 2. Additionally, the communication apparatus 100 may desire to receive the signal $y'_1$ of FIG. 9, and one of the signals $y_1^{in}$ and $y_2^{in}$ of FIG. 10.

The method uses the detector 720 to output the generated fourth signal to the digital part 140.

Operation 1370 may correspond to operations 260 through 280 of FIG. 2.

A part or all of operations 210 through 280 corresponding to operation 1360 may be performed prior to, or together with operations 1120 through 1150 of FIG. 11. For example, operation 1320 may include at least one of operations 210 through 250.

Figure 14:
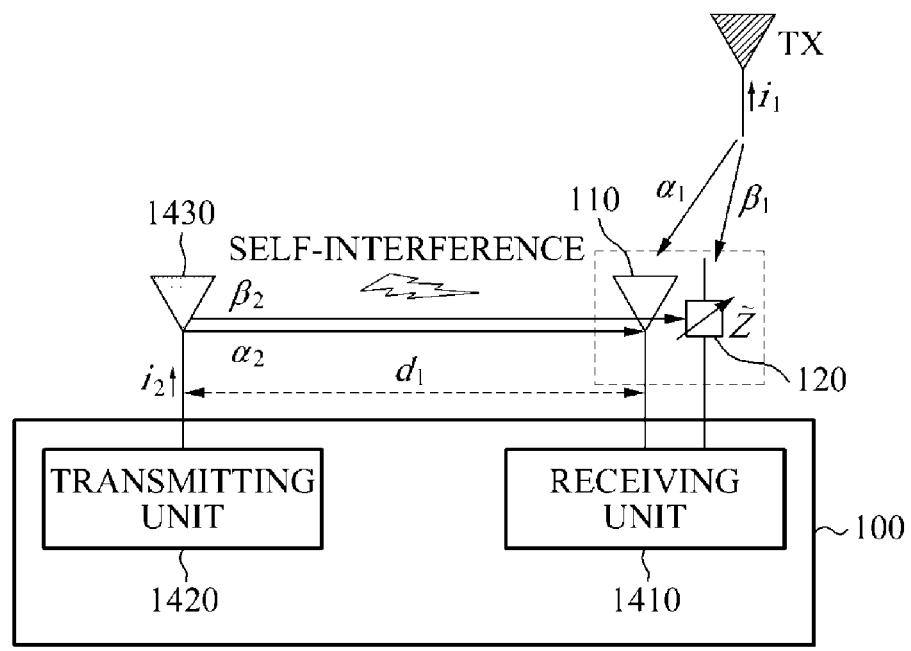
FIG. 14 is a diagram illustrating an example of the configuration of the communication apparatus to perform full-duplex communication, in accordance with an embodiment.

FIG. 14 illustrates an example of the configuration of the communication apparatus to perform full-duplex communication, in accordance with an embodiment.

Each of the communication apparatus 100 and a TX may be a full-duplex communication apparatus to support full-duplex communication.

Referring to FIG. 14, the communication apparatus 100 includes a receiving unit 1410 and a transmitting unit 1420.

When full-duplex communication is performed between the communication apparatus 100 and the TX, receiving and transmitting may be simultaneously performed. Transmitting and receiving refers to uplink signal transmission and downlink signal transmission. For example, a TX and an RX that support full-duplex communication may perform transmitting and receiving using the same frequency at the same time. Accordingly, the TX and the RX may utilize resources at a high level.

The receiving unit 1410 includes the active element 110, the parasitic element 120, the phase shifter 510 and the RF chain 130, which are described above. Additionally, the receiving unit 1410 further includes the sensor 710, the detector 720, the estimator 730 and the calculating unit 740 that are described above in FIG. 7.

The receiving unit 1410 receives an analog RF signal from the active element 110, and converts the received analog RF signal to a baseband signal. Additionally, the receiving unit 1410 converts the baseband signal to a digital signal using an analog-to-digital converter (ADC), decodes the digital signal, and generates the decoded digital signal or data.

The transmitting unit 1420 includes a transmission antenna 1430.

The transmitting unit 1420 encodes a digital signal or data, and generates the encoded digital signal or data. The transmitting unit 1420 converts the encoded digital signal or data to an analog baseband signal using a digital-to-analog convert (DAC), and converts the analog baseband signal to an RF signal. The transmitting unit 1420 outputs the RF signal via the transmission antenna 1430.

In an example, the digital part 140 is connected to each of the receiving unit 1410 and the transmitting unit 1420. In another example, the digital part 140 is included in each of the receiving unit 1410 and/or the transmitting unit 1420.

The active element 110 and the parasitic element 120 each operates as a reception antenna. The reception antenna and the transmission antenna 1430 operates at the same frequency.

Due to full-duplex communication, self-interference occurs in the communication apparatus 100.

In FIG. 14, $d_1$ denotes a distance between the active element 110 and the transmission antenna 1430.

Additionally, in FIG. 14, $i_2$ denotes a signal output via the transmission antenna 1430. The TX of FIG. 14 corresponds to the first TX of FIG. 3. The transmitting unit 1420 and the transmission antenna 1430 corresponds to the second TX of FIG. 3. The communication apparatus 100 receiving a signal $i_1$ output from the TX and the signal $i_2$ output from the transmission antenna 1430 may be referred to as an interference signal or a fourth signal. The transmitting unit 1420 outputs the fourth signal $i_2$ through the transmission antenna 1430 and, as a result, the fourth signal $i_2$ may interfere with the communication apparatus 100.

Typically, the fourth signal $i_2$ is greater in magnitude than the signal $i_1$. Due to a difference in the magnitude, the parasitic element 120 may be located adjacent to the active element 110. As described above with reference to FIGS. 1 through 13, the interference signal $i_2$ is cancelled using the parasitic element 120 and the phase shifter 510, and the signal $i_1$ that the communication apparatus 100 desires to receive may be restored or acquired.

$\tilde{Z}$ denotes a value of mutual coupling of the mutual coupling control circuit 310.

A first signal $V_1$ received at the active element 110 is defined as shown in Equation 17 below.

$$V_1 = \frac{1}{1-\gamma^2}(\alpha_1 i_1 + \alpha_2 i_2 + n_1 - \tilde{Z}(\beta_1 i_1 + \beta_2 i_2 + n_2)) \quad \text{[Equation 17]}$$

In Equation 17, $\alpha_1$ denotes a channel coefficient of a channel between the active element 110 and a TX that transmits a signal desired by the communication apparatus 100, and $\alpha_2$ denotes a channel coefficient of a channel between the active element 110 and the transmission antenna 1430 used to transmit an interference signal.

$\beta_1$ denotes a channel coefficient of a channel between the TX and the parasitic element 120, and $\beta_2$ denotes a channel coefficient of a channel between the parasitic element 120 and the transmission antenna 1430.

$n_1$ denotes noise in the active element 110, and $n_2$ denotes noise in the parasitic element 120.

When the value $\tilde{Z}$ is set as shown in Equation 18 below, the first signal $V_1$ may be defined as shown in Equation 19 below.

$$\tilde{Z} = \frac{\alpha_2}{\beta_2} \quad \text{[Equation 18]}$$

$$V_1 = \alpha'_1 i_1 + n'_1 \quad \text{[Equation 19]}$$

$\alpha'_1$ denotes a new channel coefficient of the channel between the TX and the active element 110 after interference cancellation.

$n'_1$ denotes new noise after interference cancellation.

Additionally, the third signal $V_{in}$ input to the RF chain 130 may be identical to the first signal $V_1$ in which interference is cancelled by interaction.

Referring to Equation 19, the third signal $V_{in}$ may be independent of the interference signal $i_2$ output from the transmission antenna 1430. For example, when a signal is received from a reception antenna of a terminal or a base station, a signal transmitted through a transmission antenna of the terminal or the base station may interfere with the received signal. In this example, interference between the signals may be cancelled through the parasitic element 120 or a parasitic antenna. By cancelling the interference, a signal-to-interference-plus-noise ratio (SINR) of the received signal is enhanced, and full-duplex wireless communication is smoothly performed.

The above-description of FIGS. 1 through 13 is also applicable to the example of FIG. 14 and accordingly, will not be repeated here.

Figure 15:
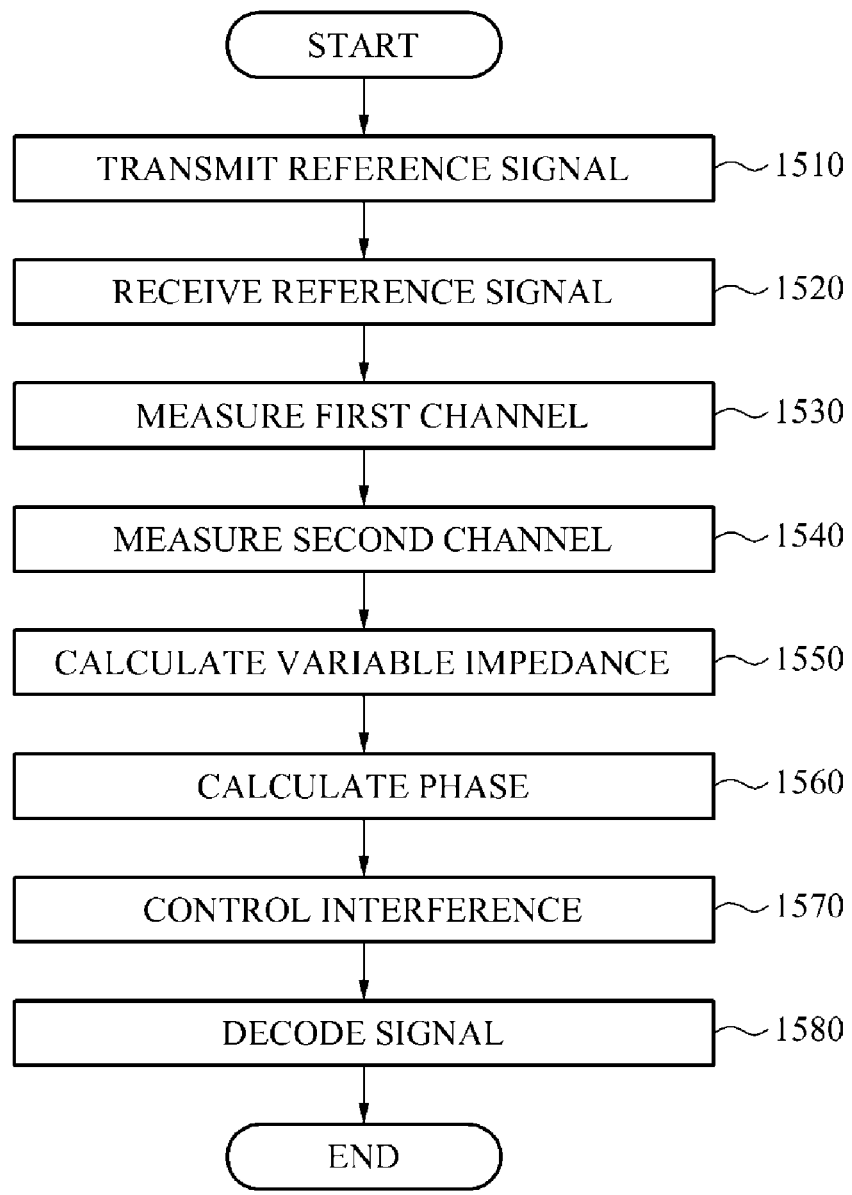
FIG. 15 is a flowchart illustrating an example of a full-duplex communication method, in accordance with an embodiment.

FIG. 15 illustrates an example of a full-duplex communication method, in accordance with an embodiment.

The full-duplex communication method is performed at the communication apparatus 100 including the receiving unit 1410 and the transmitting unit 1420 of FIG. 14 to cancel interference from a signal output from the transmitting unit 1420.

Referring to FIG. 15, in operation 1510, the method outputs from the transmitting unit 1420 through the transmission antenna 1430 data and a reference signal used to estimate a channel.

In operation 1520, the method receives at the sensor 710 the reference signal and data.

In operation 1530, the method measures, using the detector 720, a first channel between the transmitting unit 1420 and the receiving unit 1410 based on a signal received at the active element 110. In an example, the detector 720 measures the first channel based on the first signal $V_1$ or the third signal $V_{in}$. In this example, appropriate interference cancellation is not performed on the first signal $V_1$ or the third signal $V_{in}$. In another example, the detector 720 measures the first channel based on the reference signal.

In operation 1540, the method measures, using the detector 720, a second channel between a TX and an RX based on the signal received by the active element 110. The RX may be, for example, the communication apparatus 100. The TX outputs a signal required by the communication apparatus 100. In an example, the method measures, using the detector 720, measures the second channel based on the first signal $V_1$ or the third signal $V_{in}$. In this example, appropriate interference cancellation is not performed on the first signal $V_1$ or the third signal $V_{in}$. In another example, the method measures, using the detector 720, the second channel based on the reference signal.

In operation 1550, the method calculates, through the impedance calculator 750, variable impedance suitable for interference control, based on the measured first channel and the measured second channel. For example, the load impedance of the mutual coupling control circuit 310 of FIG. 3 may be calculated.

The calculated variable impedance may be used to adjust the value $Z_L$ of FIG. 3.

In operation 1560, the method calculates, using the phase calculator 760, the phase of the phase shifter 510 based on the calculated variable impedance, the measured first channel, and the measured second channel. The phase includes, for example, the values a and b of FIG. 5.

In operation 1570, the method controls interference at the communication apparatus 100. Interference is caused by a signal $i_2$ output from the transmitting unit 1420.

Operation 1570 may correspond to a part or all of operations 210 through 280 of FIG. 2, for example, operations 210 through 250.

In operation 1580, the method decodes, using the detector 720, the signal desired by the communication apparatus 100, and generates a fourth signal to be input to the digital part 140. The fourth signal may be, for example, a digital signal.

For example, the communication apparatus 100 may desire to receive a signal output from the sensor 710, or the third signal $V_{in}$ of FIG. 2.

The detector 720 outputs the generated fourth signal to the digital part 140.

Operation 1580 may correspond to operations 260 through 280 of FIG. 2.

A part or all of operations 210 through 280 corresponding to operation 1570 may be performed prior to or together with operations 1510 through 1560. For example, operation 1520 may include at least one of operations 210 through 250. In this example, the reference signal, the first signal $V_1$ and the second signal $V_2$ may be simultaneously received in a single operation, or at a single point in time.

The units, parts, and elements described herein are implemented using hardware components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIG. 7 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 2, 4, 6, 8, 11, 13, and 15.

Program instructions to perform a method described in FIGS. 2, 4, 6, 8, 11, 13, and 15, or one or more operations thereof, may be recorded, stored, or fixed in one or more non-transitory computer-readable storage media. The program instructions may be implemented by a computer. The computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein. As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication apparatus, comprising:
   an active element configured to receive a first signal;
   a parasitic element comprising an adjustable load impedance and configured to receive a second signal; and
   a mutual coupling control circuit configured to adjust a value of the load impedance of the parasitic element and a value of mutual coupling between the active element and the parasitic element based on a first channel between the active element and another communication apparatus transmitting an interference signal, and a second channel between the parasitic element and the other communication apparatus,
   wherein a third signal is generated by cancelling interference in the first signal based on the value of the load impedance and the value of the mutual coupling.

2. The communication apparatus of claim 1, wherein the communication apparatus is configured to cancel the interference by applying the second signal to the first signal, and
   wherein the interference is cancelled through the mutual coupling caused by the parasitic element.

3. The communication apparatus of claim 1, wherein the mutual coupling control circuit cancels the interference through the mutual coupling between the first signal and the second signal.

4. The communication apparatus of claim 3, wherein the mutual coupling is performed through adjustment of the value of the load impedance and the value of the mutual coupling of the mutual coupling control circuit.

5. The communication apparatus of claim 1, further comprising:
   a phase shifter configured to apply phase shifting to each of the first signal and the second signal, and to generate the third signal.

6. The communication apparatus of claim 1, wherein the third signal is generated by cancelling the interference in the first signal using parasitic elements.

7. The communication apparatus of claim 1, further comprising:
   a phase shifter configured to apply phase shifting to each of the first signal and second signals to generate the third signal.

8. The communication apparatus of claim 1, further comprising:
   active elements, wherein third signals are simultaneously generated, and
   wherein a number of the active elements is equal to a number of the third signals.

9. The communication apparatus of claim 1, wherein first signals are generated by a transmitter (TX), and the third signal is generated by cancelling signals other than a signal that the communication apparatus desires to receive, among the first signals.

10. The communication apparatus of claim 1, further comprising:
    a transmitting unit configured to output a fourth signal, wherein the communication apparatus supports full-duplex communication, and
    wherein the fourth signal causes the interference.

11. The communication apparatus of claim 1, wherein the parasitic element is a non-active element different from the active element.

12. The communication apparatus of claim 1, wherein the mutual coupling control circuit includes an RLC circuit with a resistor, an inductor, and a capacitor.

13. A communication method, comprising:
    calculating a load impedance of a parasitic element to control interference; and
    cancelling interference in a first signal output from an active element to generate a third signal, using the parasitic element of which the load impedance is adjusted to the calculated load impedance based on a first channel between the active element and another communication apparatus transmitting an interference signal, and a second channel between the parasitic element and the other communication apparatus.

14. The communication method of claim 13, wherein the interference is cancelled through the mutual coupling caused by the parasitic element.

15. The communication method of claim 13, wherein the generating comprises generating the third signal by cancelling interference signals in the first signal using parasitic elements.

16. The communication method of claim 13, further comprising:
    simultaneously generating third signals, wherein a number of active elements is equal to a number of the third signals.

17. The communication method of claim 13, wherein the third signal is generated by cancelling first signals other than the first signal that the communication apparatus desires to receive.

18. The communication method of claim 13, wherein the parasitic element receives the second signal, wherein the third signal is generated by cancelling interference in the first signal using the second signal.

19. A non-transitory computer readable recording medium storing a program to cause a computer to perform the method of claim 13.

20. The communication method of claim 13, wherein the cancelling of the interference includes adjusting the calculated load impedance based on an interference control value, wherein the interference control value is calculated based on a ratio between the first channel and second channel.

21. A communication method, comprising:
    calculating a variable load impedance of a parasitic element to control interference;
    calculating a corresponding phase for a first signal and a second signal based on the calculated variable load impedance, a first channel between an active element and another communication apparatus transmitting an interference signal, and a second channel between the parasitic element and the other communication apparatus; and
    generating a third signal by cancelling interference in the first signal based on the calculated corresponding phase of the first signal and the second signal,
    wherein the first signal and the second signal are output respectively from the active element and the parasitic element.

22. A non-transitory computer readable recording medium storing a program to cause a computer to perform the method of claim 21.

23. A communication apparatus, comprising:
    a processor configured to:
      receive a first signal from an active element;
      receive a second signal from a parasitic element;
      calculate a variable load impedance of the parasitic element to control interference in the first signal;
      calculate a corresponding phase for the first signal and the second signal based on the calculated variable load impedance, a first channel between the active element and another communication apparatus transmitting an interference signal, and a second channel between the parasitic element and the other communication apparatus;

adjust a respective phase of the first signal and the second signal based on the calculated corresponding phase for the first signal and the second signal;

generate a third signal by applying the second signal to the first signal to cancel interference in the first signal; and generate a digital signal based on the third signal in which interference is cancelled.

24. The communication apparatus of claim 23, wherein the respective phase applied by the processor to the first signal is different from the respective phase applied to the second signal by the processor, to cancel interference on the first signal.

25. The communication apparatus of claim 23, wherein the processor comprises a phase shifter configured to shift a phase of each of the first signal and the second signal, and generate the third signal by combining the first signal and the second signal with the shifted phases, and an RF chain configured to receive the third signal from the phase shifter and output the digital signal based on the third signal.

26. The communication apparatus of claim 23, wherein a distance between the active element and the parasitic element is less than $\lambda/2$.

27. The communication apparatus of claim 23, further comprising:

a mutual coupling controller connected to the parasitic element and configured to cancel the interference in the first signal by adjusting a value of a load impedance and a value of mutual coupling between the first signal and the second signal.

* * * * *